(12) United States Patent
Stephens

(10) Patent No.: US 12,365,407 B2
(45) Date of Patent: Jul. 22, 2025

(54) MECHANICALLY-TIMED FOOTSTEPS FOR A ROBOTIC DEVICE

(71) Applicant: BOSTON DYNAMICS, INC., Waltham, MA (US)

(72) Inventor: Benjamin Stephens, Somerville, MA (US)

(73) Assignee: BOSTON DYNAMICS, INC., Waltham, MA (US)

(*) Notice: Subject to any disclaimer, the term of this patent is extended or adjusted under 35 U.S.C. 154(b) by 0 days.

(21) Appl. No.: 18/299,650

(22) Filed: Apr. 12, 2023

(65) Prior Publication Data

US 2023/0322315 A1    Oct. 12, 2023

Related U.S. Application Data

(63) Continuation of application No. 17/158,086, filed on Jan. 26, 2021, now Pat. No. 11,654,985, which is a
(Continued)

(51) Int. Cl.
| | |
|---|---|
| *B62D 57/032* | (2006.01) |
| *B25J 9/16* | (2006.01) |
| *G05D 1/00* | (2006.01) |

(52) U.S. Cl.
CPC .......... *B62D 57/032* (2013.01); *B25J 9/1633* (2013.01); *B25J 9/1651* (2013.01); *G05D 1/0891* (2013.01); *Y10S 901/01* (2013.01)

(58) Field of Classification Search
CPC ..... B62D 57/032; B25J 9/1633; B25J 9/1651; B25J 9/1664; B25J 9/0006; G05D 1/0891; G05D 2109/12; Y10S 901/01
See application file for complete search history.

(56) References Cited

U.S. PATENT DOCUMENTS

| 4,834,200 A | 5/1989 | Kajita |
|---|---|---|
| 5,151,859 A | 9/1992 | Yoshino et al. |

(Continued)

FOREIGN PATENT DOCUMENTS

| CN | 101870311 B | 5/2012 |
|---|---|---|
| CN | 102530122 A | 7/2012 |

(Continued)

OTHER PUBLICATIONS

Abe et al., "Multiobjective Control with Frictional Contacts", Association for Computing Machinery, Inc. SIGGRAPH Symposium on Computer Animation, Aug. 4-5, 2007, San Diego, California, 10 pages.

(Continued)

*Primary Examiner* — Bao Long T Nguyen
(74) *Attorney, Agent, or Firm* — Knobbe, Martens, Olson & Bear, LLP

(57) ABSTRACT

An example implementation for determining mechanically-timed footsteps may involve a robot having a first foot in contact with a ground surface and a second foot not in contact with the ground surface. The robot may determine a position of its center of mass and center of mass velocity, and based on these, determine a capture point for the robot. The robot may also determine a threshold position for the capture point, where the threshold position is based on a target trajectory for the capture point after the second foot contacts the ground surface. The robot may determine that the capture point has reached this threshold position and based on this determination, and cause the second foot to contact the ground surface.

20 Claims, 8 Drawing Sheets

Related U.S. Application Data continuation of application No. 16/281,204, filed on Feb. 21, 2019, now Pat. No. 11,225,294, which is a continuation of application No. 15/331,167, filed on Oct. 21, 2016, now Pat. No. 10,246,151, which is a continuation of application No. 14/585,542, filed on Dec. 30, 2014, now Pat. No. 9,499,218.

(56) References Cited

U.S. PATENT DOCUMENTS

| | | |
|---|---|---|
| 5,221,883 A | 6/1993 | Takenaka et al. |
| 5,355,064 A | 10/1994 | Yoshino et al. |
| 5,357,433 A | 10/1994 | Takenaka et al. |
| 5,416,393 A * | 5/1995 | Gomi .................. B62D 57/032 901/1 |
| 5,423,708 A | 6/1995 | Allen |
| 5,432,417 A | 7/1995 | Takenaka et al. |
| 5,459,659 A | 10/1995 | Takenaka |
| 5,644,204 A | 7/1997 | Nagle |
| 5,737,217 A | 4/1998 | Nishikawa et al. |
| 5,802,382 A | 9/1998 | Greenberger et al. |
| 5,808,433 A | 9/1998 | Tagami et al. |
| 5,838,130 A | 11/1998 | Ozawa |
| 5,842,533 A | 12/1998 | Takeuchi |
| 5,929,585 A * | 7/1999 | Fujita .................. B62D 57/032 901/1 |
| 5,974,366 A | 10/1999 | Kawai et al. |
| 6,064,167 A | 5/2000 | Takenaka et al. |
| 6,243,623 B1 | 6/2001 | Takenaka et al. |
| 6,289,265 B1 | 9/2001 | Takenaka et al. |
| 6,317,652 B1 | 11/2001 | Osada |
| 6,374,157 B1 | 4/2002 | Takamura |
| 6,462,498 B1 | 10/2002 | Filo |
| 6,463,356 B1 | 10/2002 | Hattori |
| 6,484,068 B1 | 11/2002 | Yamamoto et al. |
| 6,493,607 B1 | 12/2002 | Bourne et al. |
| 6,802,382 B2 | 10/2004 | Hattori et al. |
| 6,898,485 B2 | 5/2005 | Kuroki et al. |
| 6,920,374 B2 | 7/2005 | Takenaka et al. |
| 6,943,520 B2 | 9/2005 | Furuta et al. |
| 6,992,455 B2 | 1/2006 | Kato et al. |
| 6,992,457 B2 | 1/2006 | Furuta et al. |
| 6,999,851 B2 | 2/2006 | Kato et al. |
| 7,013,201 B2 | 3/2006 | Hattori et al. |
| 7,031,806 B2 | 4/2006 | Kuroki et al. |
| 7,076,331 B1 | 7/2006 | Nagatsuka et al. |
| 7,120,518 B2 | 10/2006 | Takenaka et al. |
| 7,236,852 B2 | 6/2007 | Moridaira et al. |
| 7,308,336 B2 | 12/2007 | Takenaka et al. |
| 7,319,918 B2 | 1/2008 | Takenaka et al. |
| 7,319,919 B2 | 1/2008 | Takenaka et al. |
| 7,379,789 B2 | 5/2008 | Takenada et al. |
| 7,386,364 B2 | 6/2008 | Mikami et al. |
| 7,437,214 B2 | 10/2008 | Sabe et al. |
| 7,598,695 B2 | 10/2009 | Takanishi et al. |
| 7,603,234 B2 | 10/2009 | Takenaka et al. |
| 7,606,634 B2 | 10/2009 | Takenaka et al. |
| 7,657,345 B2 | 2/2010 | Endo et al. |
| 7,664,569 B2 | 2/2010 | Shimizu et al. |
| 7,734,377 B2 | 6/2010 | Hasegawa |
| 7,734,378 B2 | 6/2010 | Takenaka et al. |
| 7,805,218 B2 | 9/2010 | Nagasaka |
| 7,881,824 B2 | 2/2011 | Nagasaka et al. |
| 7,949,430 B2 | 5/2011 | Pratt et al. |
| 8,005,573 B2 | 8/2011 | Takenaka et al. |
| 8,060,253 B2 | 11/2011 | Goswami et al. |
| 8,108,070 B2 | 1/2012 | Tajima |
| 8,172,013 B2 | 5/2012 | Shimada |
| 8,195,332 B2 | 6/2012 | Pratt et al. |
| 8,237,390 B2 | 8/2012 | Godler et al. |
| 8,239,084 B2 | 8/2012 | Yamamoto et al. |
| 8,306,657 B2 | 11/2012 | Yoshiike et al. |
| 8,311,131 B2 | 11/2012 | Woyzichovski |
| 8,311,677 B2 | 11/2012 | Yoshiike et al. |
| 8,311,731 B2 | 11/2012 | Sugiura |
| 8,326,459 B2 | 12/2012 | Zaier |
| 8,332,068 B2 | 12/2012 | Goswami et al. |
| 8,386,076 B2 | 2/2013 | Honda et al. |
| 8,396,593 B2 | 3/2013 | Orita |
| 8,457,830 B2 | 6/2013 | Goulding |
| 8,509,948 B2 | 8/2013 | Roh et al. |
| 8,532,824 B2 | 9/2013 | Orita |
| 8,565,921 B2 | 10/2013 | Doi |
| 8,583,283 B2 | 11/2013 | Takenaka et al. |
| 8,630,763 B2 | 1/2014 | Goulding |
| 8,688,307 B2 | 4/2014 | Sekiya |
| 8,738,178 B2 | 5/2014 | Choi et al. |
| 8,805,580 B2 | 8/2014 | Kamioka et al. |
| 8,814,949 B2 | 8/2014 | Gramnaes |
| 8,825,391 B1 | 9/2014 | Urmson et al. |
| 8,849,454 B2 | 9/2014 | Yun et al. |
| 8,855,820 B2 | 10/2014 | Seo et al. |
| 8,855,821 B2 | 10/2014 | Seo et al. |
| 8,864,846 B2 | 10/2014 | Herr et al. |
| 8,924,021 B2 | 12/2014 | Dariush et al. |
| 8,938,319 B2 | 1/2015 | Park et al. |
| 8,942,848 B2 | 1/2015 | Pratt et al. |
| 8,948,956 B2 | 2/2015 | Takahashi et al. |
| 8,958,915 B2 | 2/2015 | Takagi |
| 8,965,573 B2 | 2/2015 | Maisonnier et al. |
| 8,987,896 B2 | 3/2015 | Cheah et al. |
| 9,043,029 B2 | 5/2015 | Seo |
| 9,044,862 B2 | 6/2015 | Kim et al. |
| 9,102,055 B1 | 8/2015 | Konolige et al. |
| 9,207,678 B2 | 12/2015 | Kim |
| 9,259,838 B1 | 2/2016 | Blankespoor et al. |
| 9,266,233 B2 | 2/2016 | Kornbluh et al. |
| 9,283,949 B2 | 3/2016 | Saunders et al. |
| 9,308,648 B2 | 4/2016 | Perkins et al. |
| 9,317,743 B2 | 4/2016 | Datta et al. |
| 9,352,470 B1 | 5/2016 | Silva et al. |
| 9,376,151 B2 | 6/2016 | Park et al. |
| 9,387,588 B1 | 7/2016 | Blankespoor et al. |
| 9,387,896 B1 | 7/2016 | Blankespoor et al. |
| 9,395,726 B1 | 7/2016 | Rizzi et al. |
| 9,446,518 B1 | 9/2016 | Blankespoor |
| 9,499,218 B1 | 11/2016 | Stephens |
| 9,561,592 B1 | 2/2017 | Silva et al. |
| 9,594,377 B1 | 3/2017 | Perkins et al. |
| 9,618,937 B1 | 4/2017 | Blankespoor et al. |
| 9,623,568 B1 | 4/2017 | da Silva et al. |
| 9,663,165 B1 | 5/2017 | Blankespoor et al. |
| 9,731,416 B1 | 8/2017 | Saunders et al. |
| 9,789,611 B1 | 10/2017 | Blankespoor et al. |
| 9,862,095 B2 | 1/2018 | Takagi et al. |
| 9,925,667 B1 | 3/2018 | Berard et al. |
| 9,926,025 B1 | 3/2018 | Blankespoor et al. |
| 10,081,098 B1 | 9/2018 | Nelson et al. |
| 10,220,518 B2 | 3/2019 | Jackowski et al. |
| 10,226,870 B1 | 3/2019 | da Silva et al. |
| 10,246,151 B1 | 4/2019 | Stephens |
| 10,300,969 B1 | 5/2019 | Blankespoor et al. |
| 10,406,690 B1 | 9/2019 | Blankespoor et al. |
| 10,441,439 B2 | 10/2019 | Goldfarb et al. |
| 10,668,624 B2 | 6/2020 | Blankespoor et al. |
| 10,688,667 B1 | 6/2020 | Berard et al. |
| 10,888,999 B2 | 1/2021 | Blankespoor et al. |
| 11,203,385 B1 | 12/2021 | Blankespoor et al. |
| 11,225,294 B1 | 1/2022 | Stephens |
| 11,247,344 B2 | 2/2022 | Berard et al. |
| 11,654,569 B2 | 5/2023 | Blankespoor et al. |
| 11,654,984 B2 | 5/2023 | Blankespoor et al. |
| 11,654,985 B2 | 5/2023 | Stephens |
| 12,097,609 B2 | 9/2024 | Berard et al. |
| 12,128,570 B2 | 10/2024 | Blankespoor et al. |
| 12,139,217 B2 | 11/2024 | Blankespoor et al. |
| 2002/0183897 A1 | 12/2002 | Kuroki et al. |
| 2003/0009259 A1 | 1/2003 | Hattori et al. |
| 2003/0114960 A1 | 6/2003 | Takenaka et al. |
| 2003/0120388 A1 | 6/2003 | Kuroki et al. |
| 2003/0125839 A1 | 7/2003 | Takenaka et al. |
| 2003/0154201 A1 | 8/2003 | Berestov |
| 2004/0044440 A1 | 3/2004 | Takenaka |
| 2004/0099450 A1 | 5/2004 | Kowk et al. |

(56) References Cited

U.S. PATENT DOCUMENTS

| | | |
|---|---|---|
| 2004/0167641 A1 | 8/2004 | Kawai et al. |
| 2004/0172165 A1 | 9/2004 | Iribe et al. |
| 2004/0193323 A1 | 9/2004 | Higaki et al. |
| 2004/0205417 A1 | 10/2004 | Moridaira et al. |
| 2004/0206164 A1 | 10/2004 | Kawai et al. |
| 2004/0230340 A1 | 11/2004 | Fukuchi et al. |
| 2004/0236467 A1 | 11/2004 | Sano |
| 2005/0021176 A1 | 1/2005 | Takenaka et al. |
| 2005/0033475 A1 | 2/2005 | Kuroki et al. |
| 2005/0065650 A1 | 3/2005 | Lewis |
| 2005/0067993 A1 | 3/2005 | Kato et al. |
| 2005/0075755 A1 | 4/2005 | Takenaka et al. |
| 2005/0077856 A1 | 4/2005 | Takenaka et al. |
| 2005/0110448 A1 | 5/2005 | Takenaka et al. |
| 2005/0113973 A1 | 5/2005 | Endo et al. |
| 2005/0120820 A1 | 6/2005 | Takenaka et al. |
| 2005/0125099 A1 | 6/2005 | Mikami et al. |
| 2005/0126833 A1 | 6/2005 | Takenaka |
| 2005/0156551 A1 | 7/2005 | Takenaka et al. |
| 2005/0165507 A1 | 7/2005 | Shimizu et al. |
| 2005/0171635 A1 | 8/2005 | Furuta et al. |
| 2005/0216097 A1 | 9/2005 | Rikin |
| 2005/0228539 A1 | 10/2005 | Takenaka et al. |
| 2005/0240307 A1 | 10/2005 | Kuroki et al. |
| 2006/0064203 A1 | 2/2006 | Goto et al. |
| 2006/0076167 A1 | 4/2006 | Setrakian et al. |
| 2006/0090938 A1 | 5/2006 | Tanielian |
| 2006/0173578 A1 | 8/2006 | Takenaka et al. |
| 2006/0247800 A1 | 11/2006 | Takenaka et al. |
| 2007/0003915 A1 | 1/2007 | Templeman |
| 2007/0013506 A1 | 1/2007 | Takenaka et al. |
| 2007/0016329 A1 | 1/2007 | Herr et al. |
| 2007/0126387 A1 | 6/2007 | Takenaka et al. |
| 2007/0150095 A1 | 6/2007 | Zaier |
| 2007/0152620 A1 | 7/2007 | Takenaka et al. |
| 2007/0156283 A1 | 7/2007 | Takenaka |
| 2007/0162152 A1 | 7/2007 | Herr et al. |
| 2007/0168080 A1 | 7/2007 | Takenaka et al. |
| 2007/0193789 A1 | 8/2007 | Takenaka et al. |
| 2007/0220637 A1 | 9/2007 | Endo et al. |
| 2007/0227786 A1 | 10/2007 | Hillis et al. |
| 2007/0241713 A1 | 10/2007 | Yamamoto et al. |
| 2007/0273320 A1 | 11/2007 | Shishido et al. |
| 2008/0065269 A1 | 3/2008 | Hasegawa |
| 2008/0133055 A1 | 6/2008 | Hasegawa |
| 2008/0160873 A1 | 7/2008 | Yoneda |
| 2008/0208391 A1 | 8/2008 | Hasegawa et al. |
| 2009/0005906 A1 | 1/2009 | Tajima |
| 2009/0030530 A1 | 1/2009 | Martin |
| 2009/0171503 A1 | 7/2009 | Takenaka et al. |
| 2009/0306821 A1 | 12/2009 | Park et al. |
| 2009/0312867 A1 | 12/2009 | Hasegawa et al. |
| 2009/0325699 A1 | 12/2009 | Delgiannidis |
| 2010/0017028 A1 | 1/2010 | Suga et al. |
| 2010/0042256 A1 | 2/2010 | Takenaka et al. |
| 2010/0113980 A1 | 5/2010 | Herr et al. |
| 2010/0114329 A1 | 5/2010 | Casler et al. |
| 2010/0126785 A1 | 5/2010 | Shimada |
| 2010/0057253 A1 | 6/2010 | Kwon et al. |
| 2010/0161120 A1 | 6/2010 | Goswami et al. |
| 2010/0161126 A1 | 6/2010 | Goswami et al. |
| 2010/0174409 A1 | 7/2010 | Park et al. |
| 2010/0243344 A1 | 9/2010 | Wyrobek et al. |
| 2010/0252395 A1 | 10/2010 | Lehtonen et al. |
| 2010/0277483 A1 | 11/2010 | Lee et al. |
| 2010/0292838 A1 | 11/2010 | Goswami et al. |
| 2011/0009241 A1 | 1/2011 | Lane et al. |
| 2011/0022232 A1 | 1/2011 | Yoshiike et al. |
| 2011/0098856 A1 | 4/2011 | Yoshiike |
| 2011/0098857 A1 | 4/2011 | Yoshiike et al. |
| 2011/0098860 A1 | 4/2011 | Yoshiike et al. |
| 2011/0172823 A1 | 7/2011 | Kim et al. |
| 2011/0172825 A1 | 7/2011 | Lee et al. |
| 2011/0178636 A1 | 7/2011 | Kwon et al. |
| 2011/0178637 A1 | 7/2011 | Lee et al. |
| 2011/0224827 A1 | 9/2011 | Andoh |
| 2011/0231050 A1 | 9/2011 | Goulding |
| 2011/0257764 A1 | 10/2011 | Herr et al. |
| 2011/0264264 A1 | 10/2011 | Shirokura et al. |
| 2011/0301756 A1 | 12/2011 | Yoshiike et al. |
| 2012/0072026 A1 | 3/2012 | Takagi |
| 2012/0143376 A1 | 6/2012 | Seo |
| 2012/0158175 A1 | 6/2012 | Lee et al. |
| 2012/0158181 A1 | 6/2012 | Seo et al. |
| 2012/0158182 A1 | 6/2012 | Lee et al. |
| 2012/0203359 A1 | 8/2012 | Schimmels et al. |
| 2012/0245734 A1 | 9/2012 | Yun et al. |
| 2012/0259463 A1 | 10/2012 | Orita |
| 2012/0277907 A1 | 11/2012 | Kim et al. |
| 2012/0303162 A1 | 11/2012 | Orita |
| 2012/0310412 A1* | 12/2012 | Seo ............... B25J 9/0006 700/254 |
| 2012/0316662 A1 | 12/2012 | Huh et al. |
| 2012/0316682 A1 | 12/2012 | Seo et al. |
| 2012/0316683 A1 | 12/2012 | Seo et al. |
| 2012/0316684 A1 | 12/2012 | Lee et al. |
| 2013/0079929 A1 | 3/2013 | Lim et al. |
| 2013/0123669 A1 | 5/2013 | Kinoshita et al. |
| 2013/0144439 A1 | 6/2013 | Lee et al. |
| 2013/0144441 A1 | 6/2013 | Kanazawa et al. |
| 2013/0158712 A1 | 6/2013 | Lee et al. |
| 2013/0178983 A1 | 7/2013 | Watabe |
| 2013/0184861 A1 | 7/2013 | Pratt et al. |
| 2013/0206488 A1 | 8/2013 | Horinouchi |
| 2013/0238122 A1 | 9/2013 | Hodgins et al. |
| 2013/0238183 A1 | 9/2013 | Goulding |
| 2014/0019082 A1 | 1/2014 | Lan et al. |
| 2014/0081424 A1 | 3/2014 | Herr et al. |
| 2014/0081461 A1 | 3/2014 | Williamson et al. |
| 2014/0320489 A1 | 10/2014 | Chizeck et al. |
| 2015/0051734 A1 | 2/2015 | Zheng et al. |
| 2015/0073592 A1 | 3/2015 | Kaneko et al. |
| 2015/0120044 A1 | 4/2015 | Cory |
| 2015/0134079 A1 | 5/2015 | Yoon et al. |
| 2015/0134080 A1 | 5/2015 | Roh |
| 2015/0202768 A1 | 7/2015 | Moridaira |
| 2015/0202775 A1 | 7/2015 | Inazumi |
| 2015/0217447 A1 | 8/2015 | Kamioka et al. |
| 2015/0286221 A1 | 10/2015 | Goulding |
| 2015/0297934 A1 | 10/2015 | Agrawal et al. |
| 2015/0302777 A1 | 10/2015 | Campolo |
| 2016/0016308 A1 | 1/2016 | Kanazawa et al. |
| 2019/0351555 A1 | 11/2019 | Blankespoor et al. |
| 2020/0269430 A1 | 8/2020 | Blankespoor et al. |
| 2020/0290213 A1 | 9/2020 | Berard et al. |
| 2021/0146548 A1 | 5/2021 | Blankespoor et al. |
| 2021/0171135 A1 | 6/2021 | Blankespoor et al. |
| 2022/0134576 A1 | 5/2022 | Berard et al. |
| 2022/0143828 A1 | 5/2022 | Blankespoor et al. |
| 2023/0264358 A1 | 8/2023 | Blankespoor et al. |
| 2024/0246623 A1 | 7/2024 | Blankespoor et al. |

FOREIGN PATENT DOCUMENTS

| | | |
|---|---|---|
| CN | 102785542 A | 11/2012 |
| EP | 2110210 | 3/2011 |
| JP | 2007061953 A | 3/2007 |
| KR | 100815247 B1 | 3/2008 |
| KR | 20100100119 A | 9/2010 |
| KR | 101046710 B1 | 7/2011 |
| WO | WO 2016119068 | 8/2016 |

OTHER PUBLICATIONS

Bajracharya et al., "High fidelity day/night stereo mapping with vegetation and negative obstacle detection for vision-in-the-loop walking", 2013 IEEE/RSJ International Conference on Intelligent Robots and Systems (IROS), Nov. 2013, IEEE, Tokyo, Japan, pp. 3663-3670.

Boone et al., Autonomous Robots 4(3), "Slipping and Tripping Reflexes for Bipedal Robots", College of Computing, Georgia Institute of Technology, 11 pages (Dec. 1996).

(56) References Cited

OTHER PUBLICATIONS

Brandao et al., "Footstep Planning for Slippery and Slanted Terrain Using Human-Inspired Models", 2016, IEEE, pp. 868-879.
Doshi et al., "Collision Detection in Legged Locomotion using Supervised Learning", 2007, MIT Cambridge, US, pp. 317-322.
Focchi et al., , "Slip Detection and Recovery for Quadruped Robots", Instituto Italiano d: Technologies, 2005, 3 pages (2015).
Hash Lamon et al., "Simple Virtual Slip Force Sensor for walking biped robots", 2013, IEEE, pp. 1-5.
Hyon et al., "Simultaneous Adaption to Rough Terrain and Unknown External Forces for Biped Humanoids", 2007, IEEE, pp. 19-26.
Joo et al., "Balancing of Legged Mechanism with Multiple Segments", 2013, IEEE International Conference on Robotics and Automation (ICRA), Karlsruhe, Germany, May 6-10, 2013, IEEE, pp. 5683-5688.
Kawamura et al., "Maintaining floor-foot contact of a biped robot by force constraint position control", Proceedings of the 2011 IEEE International Conference on Mechatronics, Apr. 13-15, 2011, Istanbul, Turkey, IEEE, 2011, pp. 857-862.
Kim et al., "Landing Force Controller for a Humanoid Robot: Time-Domain Passivity Approach", 2006 IEEE Conference on Systems, Man, and Cybernetics, Oct. 8-11, 2006, Taipei, Taiwan, IEEE, pp. 4237-4242.
Koolen et al., "Capturability-based analysis and control of legged locomotion, Part 1: Theory and application to three simple gait models", The International Journal of Robotics Research, 2012, pp. 1094-1113, vol. 31, No. 9.
Pratt et al., "Capture Point: A Step toward Humanoid Push Recovery", IEEE Humanoid Robots, 2006 6th IEEE-RAS International Conference, Symposium, Dec. 4-6, 2006, pp. 1-8, Genova, Italy.
Pratt et al., "Capturability-based analysis and control of legged locomotion, Part 2: Application to M2V2, a lower-body humanoid", The International Journal of Robotics Research, Apr. 2011, pp. 1-25.
Silva et al., "Towards force interaction control of biped walking robots", Proceedings of 2004IEEE/RSJ International Conference on Intelligent Robots and Systems, Sendai, Japan, Sep. 28-Oct. 2, 2004, IEEE, pp. 2568-2573.
Silva et al., "Goal-oriented biped walking based on force interaction control", Proceedings of the 2001 IEEE Internal Conference on Robotics & Automation, Seoul, Korea, May 21-26, 2001, IEEE, pp. 4122-4127.
Van Der Ven, "Thesis: Touchdown control in bipedal robot walking", downloaded from http://resolver.tudelfl.nl/uuid:Oe2da7cc-1f21-4ff8-a2a2-66e2c7bede20, 2012, pp. 1-47.
Complaint filed Nov. 11, 2022, *Boston Dynamics, Inc. v. Ghost Robotics Corporation*, Case No. 1.22-cv-01483-UNA (D. Del.), 110 pages (involving U.S. Pat. Nos. 9,308,648; 9,662,791; 11,123,869; 9,387,588; 11,073,842; 10,253,855; 11,131,368).
Non-Final Office Action mailed on Aug. 19, 2015, issued in connection with U.S. Appl. No. 14/468,118, filed Aug. 25, 2014, 14 pages.
Notice of Allowance mailed on Mar. 14, 2016, issued in connection with U.S. Appl. No. 14/468,118, filed Aug. 25, 2014, 10 pages.
Non-Final Office Action mailed on Sep. 2, 2015, issued in connection with U.S. Appl. No. 14/468,031, filed Aug. 25, 2014, 31 pages.
Notice of Allowance mailed on Mar. 2, 2016, issued in connection with U.S. Appl. No. 14/468,031, filed Aug. 25, 2014, 7 pages.
Non-Final Office Action mailed on Apr. 29, 2016, issued in connection with U.S. Appl. No. 14/709,830, filed May 12, 2015, 39 pages.
Non-Final Office Action mailed on Apr. 15, 2016, issued in connection with U.S. Appl. No. 14/585,542, filed Dec. 30, 2014, 12 pages.
Non-Final Office Action mailed on Jun. 3, 2016, issued in connection with U.S. Appl. No. 14/538,777, filed Nov. 11, 2014, 16 pages.
Notice of Allowance mailed on Jun. 24, 2016, issued in connection with U.S. Appl. No. 14/538,777, filed Nov. 11, 2014, 20 pages.
Notice of Allowance mailed on Jul. 21, 2016, issued in connection with U.S. Appl. No. 14/585,542, filed Dec. 30, 2014, 5 pages.
Agrawal et al., "Rough Terrain Visual Odometry". Proceedings of the International Conference on Advanced Robotics (ICAR) Aug. 2007 vol. 25, p. 28-30.
Anderson et al.,"Coordinated Control and Range Imaging for Mobile Manipulation". ExperimentalRobotics: The 11th International Symposium 2009, vol. 54. p. 547-556, Springer Berlin Heidelberg; https://doi.org/10.1007/978-3-642-00196-3_63.
Barasuol et al., "A reactive Controller Framework for Quadrupedal Locomotion on Challenging Terrain." IEEE Int'l Conference Robot Autom. Karlsruhe, Germany, May 6, 2013; p. 2554-2561, doi:10.1109/ICRA.2013.6630926.
Boston Dynamics, "LS3—Legged Squad Support System," video screen shots taken from https://www.youtube.com/watch?v=R7ezXBEBE6U&t=1s, Sep. 10, 2012, downloaded Feb. 2, 2024, 5 pages.
Buehler et al., "Robots Step Outside." Int'l Symp Adaptive Motion of Animals and Machines (AMAM), Sep. 2005; p. 1-4.
Cherouvim et al., Novel Energy Transfer Mechanism in a Running Quadruped Robot with one Actuator per Leg. Advan. Robotics. Jan. 1, 2010; vol. 24, No. 7, p. 963-978.
Chestnutt J., "Navigation Planning for Legged Robots." Thesis: Carnegie Mellon University, Pittsburgh, PA; Dec. 2007, 129 pages.
DARPA Tactical Technology Office, "Legged Squad Support System (LS3) Industry Day," https://web.archive.org/web/20090117140017/http://www.darpa.mil/tto/solicit/BAA08-71/LS3_Industry_Day.pdf, Nov. 12, 2008, website capture from Jan. 17, 2009, 42 pages.
DARPAtv, "Meet ATLAS!," video screen shots taken from https://www.youtube.com/watch?v=zkBnFPBV3f0, Jul. 11, 2013, downloaded Feb. 2, 2024, 12 pages.
Ferguson et al., "A Guide to Heuristic-based Path Planning". Proceedings of the International Workshop on Planning Under Uncertainty for Autonomous Systems, Int'l Conference on Automated Planning and Scheduling (ICAPS) Jun. 6, 2005, p. 9-18.
Gallagher et al., "GATMO: A Generalized Approach to Tracking Movable Objects," In IEEE International Ionference on Robotics and Automation May 12, 2009; p. 2043-2048, doi: 10.1109/ROBOT.2009.5152863.
Görner et al., "The DLR Crawler: Evaluation of Gaits and Control of an Actively Compliant Six-legged Walking Robot." Industrial Robot: An Int'l Journal Jun. 19, 2009; vol. 36, No. 4, p. 344-351, ISSN 0143-991X, DOI 10.1108/01439910910957101.
Gregorio et al., "Design, Control, and Energetics of an Electrically Actuated Legged Robot," IEEE Transactions on Systems, Man, and Cybernetics, Part B (Cybernetics), Aug. 1997; vol. 27, No. 4, p. 626-634, doi: 10.1109/3477.604106.
Hiller et al., "Design and control of a quadruped robot walking in unstructured terrain." Proceedings of the 2004 IEEE Int'l Conf Control Applications, Taipei, Taiwan, 2004, vol. 2, p. 916-921, doi:10.1109/CCA.2004.1387486.
Howard A., "Real-time Stereo Visual Odometry for Autonomous Ground Vehicles," IEEE/RSJ International Conference on Intelligent Robots and Systems, Sep. 22, 2008, p. 3946-3952, doi: 10.1109/IROS.2008.4651147.
Howard et al., "State Space Sampling of Feasible Motions for High Performance Mobile Robot Navigation in Highly Constrained Environments," J Field Robot. Jun. 2008; vol. 25, No. 6-7, p. 325-345.
Howard et al., "State Space Sampling of Feasible Motions for High Performance Mobile Robot Navigation in Highly Constrained Environments," In Laugier, C., Siegwart, R. (eds) Field and Service Robotics. Springer Tracts in Advanced Robotics, (2008) vol. 42, p. 585-593. Springer, Berlin, Heidelberg. https://doi.org/10.1007/978-3-540-75404-6_56.
Huang et al., "Planning Walking Patterns for a Biped Robot." IEEE Trans Robot Automation. Jun. 2001; vol. 17, No. 3, p. 280-289.
Kelly et al., Toward reliable off road autonomous vehicles operating in challenging environments. The International Journal of Robotics Research. May 2006; vol. 25, No. 5-6, p. 449-483.
Kimura et al., "Adaptive Dynamic Walking of a Quadruped Robot on Irregular Terrain Based on Biological Concepts." Int'l J Robot Res. Mar.-Apr. 2003; vol. 22, No. 3-4, p. 187-202.
Kimura et al., "Adaptive Dynamic Walking of a Quadruped Robot on Natural Ground Based on Biological Concepts." The Int'l J Robot Res. May 2007; vol. 26, No. 5, p. 475-490.

(56) References Cited

OTHER PUBLICATIONS

Lin J.-N., "Gait Transitions of Legged Robots and Neural Networks Applications." Thesis University of Illinois at Chicago, 2001, 276 pages.
Matos V.E.S., "A Bio-inspired Architecture for Adaptive Quadruped Locomotion Over Irregular Terrain," Thesis, Oct. 24, 2013; 222 pages.
Michael K., "Meet Boston Dynamics' LS3—The Latest Robotic War Machine." The Conversation. Oct. 2, 2012; 8 pages, available at https://theconversation.com/meet-boston-dynamics-ls3-the-latest-robotic-warmachine-9754.
Murphy et al., "Trotting and Bounding in a Planar Two-legged Model." In Morecki et al., (eds) Theory and Practice of Robots and Manipulators. (1985), Springer, Boston, MA. 10 pages; https://doi.org/10.1007/978-1-4615-9882-4_43.
Park et al., "Optimal Locomotion Trajectory for Biped Robot 'D2'with Knees Stretched, Heel-contact Landings, and Toe-off Liftoffs." J Mech Science Tech. Dec. 2011; vol. 25, p. 3231-3241.
Raibert et al., "Bigdog, the Rough-Terrain Quadruped Robot," IFAC Proceedings Volumes. Jan. 1, 2008; vol. 41, No. 2, pp. 10822-10825.
Shkolnik et al., "Bounding on rough terrain with the LittleDog robot," The International Journal of Robotics Research, Dec. 2010, 30(2) pp. 192-215, doi:10.1177/0278364910388315.
Van Der Kooij et al., "An alternative approach to synthesizing bipedal walking." Biol Cybern. Jan. 2003; vol. 88, p. 46-59.
Wettergreen D.S., "Robotic Walking in Natural Terrain—Gait Planning and Behavior-based Control for Statically-stable Walking Robots." Thesis: Carnegie Mellon University, Dec. 1995, 142 pages.
Wight D.L., "A Foot Placement Strategy for Robust Bipedal Gait Control." Thesis University of Waterloo, Canada; 2008, 210 pages.
Defendant Ghost Robotics Corporation's Supplemental Identification of Invalidity References in *Boston Dynamics, Inc.* v. *Ghost Robotics Corporation*, Case No. 1.22-cv-01483-UNA (D. Del.), Jan. 19, 2024, 23 pages (involving U.S. Pat. Nos. 9,308,648, 9,662,791, 11,123,869, 9,387,588, 11,073,842, 10,253,855, 11,131,368)).
Complaint in *Boston Dynamics, Inc.* v. *Ghost Robotics Corporation*, Case No. 1.24-cv-00184-UNA (D. Del.), Feb. 12, 2024, 45 pages (involving U.S. Pat. Nos. 9,594,377, 9,908,240, 9,789,611, and 11,287,819).
Bona et al., "Friction Compensation in Robotics: an Overview," 44th IEEE Conference on Decision and Control, and the European Control Conference, at 4360 (Dec. 2005) doi: 10.1109/CDC.2005.1582848.
Boone, "Slipping and Tripping Reflexes for Bipedal Robots," Autonomous Robots 4, 259-271 (Sep. 1997), https://doi.org/10.1023/A:1008891909459.
"Boston Dynamics BIGDOG Robot," https://www.youtube.com/watch?v=b2bExqhhWRI, Jul. 17, 2007, obtained Oct. 5, 2023.
Chestnutt, "Safe Adjustment Regions for Legged Locomotion Paths," 2010 IEEE-RAS International Conference on Humanoid Robots, Jan. 2011, http://dx.doi.org/10.1109/ICHR.2010.5686829.
Dash et al., "Singularity-Free Path Planning of Parallel Manipulators Using Clustering Algorithm and Line Geometry," Proceedings of the 2003 IEEE, International Conference on Robotics & Automation, at 761 (Sep. 2003) doi: 10.1109/ROBOT.2003.1241685.
Gregorio et al., "Experiments with an electrically actuated planar hopping robot," Experimental Robotics III. Springer, Berlin, Heidelberg, at 2 (1994) https://citeseerx.ist.psu.edu/document?repid=rep1&type=pdf&doi=63c792133021c69c3bc736d04f3ac1afb32f72ac.
Hamed et al., "Event-Based Stabilization of Periodic Orbits for Underactuated 3-D Bipedal Robots with Left-Right Symmetry," IEEE Transactions on Robotics, vol. 30, No. 2, at 366 (Apr. 2014) doi: 10.1109/TRO.2013.2287831.
Havoutis et al., "Quadrupedal trotting with active compliance," 2013 IEEE International Conference on Mechatronics (ICM), Vicenza, Italy, 2013, pp. 610-616, at 3, (Feb. 2013) doi: 10.1109/ICMECH.2013.6519112.

Huang et al., "Sensory Reflex Control for Humanoid Walking," Transactions on Robotics, vol. 21, No. 5, at 980 (Sep. 2005), DOI: 10.1109/TRO.2005.851381.
Hyun et al., "High speed trot-running: Implementation of a hierarchical controller using proprioceptive impedance control on the MIT Cheetah," vol. 33, issue 11, at 1418 (Aug. 21, 2014) https://dspace.mit.edu/handle/1721.1/98270.
Kim et al., "Inverse Kinematic Control of Humanoids Under Joint Constraints," International Journal of Advanced Robotic Systems, at 1 (Jan. 2013) https://doi.org/10.5772/55247.
Kimura, "Adaptive Dynamic Walking of a Quadruped Robot Using a Neural System Model," Advanced Robotics, vol. 15, Issue 8 (2001), doi: 10.1109/IROS.2000.893146.
Kuffer et al., "Self-Collision Detection and Prevention for Humanoid Robots," Proceedings of the 2002 IEEE International Conference on Robotics & Automation, at 2267-68 (May 2002) doi: 10.1109/ROBOT.2002.1013569.
Nishiwaki et al., "A six-axis force sensor with parallel support mechanism to measure the ground reaction force of humanoid robot," Proceedings 2002 IEEE International Conference on Robotics and Automation (Cat. No. 02CH37292). vol. 3, at 2277, IEEE, (May 2002) doi: 10.1109/ROBOT.2002.1013571.
Okada et al., "Real-time and Precise Self Collision Detection System for Humanoid Robots," Proceedings of the 2005 IEEE International Conference on Robotics and Automation, Barcelona, Spain, Apr. 2005, doi: 10.1109/ROBOT.2005.1570256.
Papadopoulos et al., "Stable running in a quadruped robot with compliant legs," IEEE Conference Publication, IEEE Xplore, 444-449, at 446 (Apr. 2000) doi: 10.1109/ROBOT.2000.844095.
Park et al., "A finite-state machine for accommodating unexpected large ground height variations in bipedal robot walking," IEEE Trans. on Robotics, vol. 29, issue 2, pp. 331-345 (Apr. 2013) doi: 10.1109/TRO.2012.2230992.
Raibert, "Legged Robots that Balance," MIT press (Jan. 1986).
Roosen, "Ground-Contact Friction Estimation and Slip Prevention in Bipedal Robots," University of Melbourne, at 34 (2012) https://rest.neptune-prod.its.unimelb.edu.au/server/api/core/bitstreams/7e3e0b95-1ce2-5b91-80d3-7e1fc9762377/content.
Yan et al., "A fast and smooth walking pattern generator of biped robot using Jacobian inverse kinematics," 2007 IEEE Workshop on Advanced Robotics and Its Social Impacts, Hsinchu, Taiwan, 2007, pp. 1-6, doi: 10.1109/ARSO.2007.4531417.
Yang et al., "Singularity Analysis of Three-Legged Parallel Robots Based on Passive-Joint Velocities," IEEE Transactions on Robotics and Automation, vol. 17, No. 4, at 413 (Aug. 2001) doi: 10.1109/70.954754.
Exhibit D1, *Boston Dynamics, Inc.* v. *Ghost Robotics Corporation*, Case No. 1.22-cv-01483-UNA (D. Del.), 84 pages (involving U.S. Pat. Nos. 9,308,648, 9,662,791, 11,123,869, 9,387,588, 11,073,842, 10,253,855, 11,131,368).
Exhibit D2, *Boston Dynamics, Inc.* v. *Ghost Robotics Corporation*, Case No. 1.22-cv-01483-UNA (D. Del.), 101 pages (involving U.S. Pat. Nos. 9,308,648, 9,662,791, 11,123,869, 9,387,588, 11,073,842, 10,253,855, 11,131,368).
Defendant Ghost Robotics Corporation's Initial Invalidity Contentions, *Boston Dynamics, Inc.* v. *Ghost Robotics Corporation*, Case No. 1.22-cv-01483-UNA (D. Del.), 48 pages (involving U.S. Pat. Nos. 9,308,648, 9,662,791, 11,123,869, 9,387,588, 11,073,842, 10,253,855, 11,131,368).
Answer filed Feb. 10, 2023, *Boston Dynamics, Inc.* v. *Ghost Robotics Corporation*, Case No. 1.22-cv-01483-UNA (D. Del.), 28 pages (involving U.S. Pat. Nos. 9,308,648, 9,662,791, 11,123,869, 9,387,588, 11,073,842, 10,253,855, 11,131,368).
Amended Answer filed Mar. 3, 2023, *Boston Dynamics, Inc.* v. *Ghost Robotics Corporation*, Case No. 1.22-cv-01483-UNA (D. Del.), 25 pages (involving U.S. Pat. Nos. 9,308,648, 9,662,791, 11,123,869, 9,387,588, 11,073,842, 10,253,855, 11,131,368).
Second Amended Answer filed Oct. 18, 2023, *Boston Dynamics, Inc.* v. *Ghost Robotics Corporation*, Case No. 1.22-cv-01483-UNA (D. Del.), 83 pages (involving U.S. Pat. Nos. 9,308,648, 9,662,791, 11,123,869, 9,387,588, 11,073,842, 10,253,855, 11,131,368).
Neuhaus et al., "Comprehensive Summary of the Institute for Human and Machine Cognitions Experience with LittleDog," The

(56) References Cited

OTHER PUBLICATIONS

International Journal of Robotics Research, Jan. 2011, 39 pages, DOI:10.1177/0278364910390538.

Stanford, "BigDog, the Rough-Terrain Robot," video screen shots taken from https://www.youtube.com/watch?v=-Bi-tPOOOPs, Aug. 27, 2010, downloaded Apr. 26, 2024, 12 pages.

"Stanford EE Computer Systems Colloquium", The Wayback Machine, https://web.archive.org/web/20220807165701/https://web.stanford.edu/class/ee380/Abstracts/100512.html, May 12, 2010; downloaded Apr. 26, 2024, 1 page.

Defendant Ghost Robotics Corporation's Final Invalidity Contentions in *Boston Dynamics, Inc. v. GhostRobotics Corporation*, Case No. 1.22-cv-01483-UNA (D. Del.), Mar. 7, 2024, 81 pages (involving U.S. Pat. Nos. 9,308,648, 9,662,791, 11,123,869, 9,387,588, 11,073,842, 10,253,855, 11,131,368).

Exhibit D1 (Redacted), *Boston Dynamics, Inc. v. Ghost Robotics Corporation*, Case No. 1.22-cv-01483-UNA (D. Del.), Mar. 7, 2024, 283 pages (involving U.S. Pat. Nos. 9,308,648, 9,662,791, 11,123,869, 9,387,588, 11,073,842, 10,253,855, 11,131,368).

Exhibit D2 (Redacted), *Boston Dynamics, Inc. v. Ghost Robotics Corporation*, Case No. 1.22-cv-01483-UNA (D. Del.), Mar. 7, 2024, 66 pages (involving U.S. Pat. Nos. 9,308,648, 9,662,791, 11,123,869, 9,387,588, 11,073,842, 10,253,855, 11,131,368).

"AlphaDog Proto," https://www.youtube.com/watch?v=SSbZrQp-HOk, Sep. 29, 2011, obtained Aug. 14, 2023.

"Atlas Update," https://www.youtube.com/watch?v=SD6Okylclb8, Oct. 3, 2013, obtained Aug. 14, 2023.

"BigDog Overview (Updated Mar. 2010)," https://www.youtube.com/watch?v=cNZPRsrwumQ, Apr. 22, 2010, obtained Aug. 14, 2023.

"BigDog Reflexes," https://www.youtube.com/watch?v=3gi6Ohnp9x8, Jan. 27, 2009, obtained Aug. 14, 2023.

"Petman," https://www.youtube.com/watch?v=mclbVTIYG8E, Oct. 30, 2011, obtained Aug. 14, 2023.

"Petman Prototype," https://www.youtube.com/watch?v=67CUudkjEG4, Oct. 26, 2009, obtained Aug. 14, 2023.

\* cited by examiner

MECHANICALLY-TIMED FOOTSTEPS FOR A ROBOTIC DEVICE

CROSS REFERENCE TO RELATED APPLICATIONS

This U.S. patent application is a continuation of, and claims priority under 35 U.S.C. § 120 from, U.S. patent application Ser. No. 17/158,086, filed on Jan. 26, 2021, which is a continuation of U.S. patent application Ser. No. 16/281,204, filed on Feb. 21, 2019, now U.S. Pat. No. 10,246,151 B1, which is a continuation of U.S. patent application Ser. No. 15/331,167, filed on Oct. 21, 2016, now U.S. Pat. No. 10,246,151 B1, which is a continuation of U.S. patent application Ser. No. 14/585,542, filed on Dec. 30, 2014, now U.S. Pat. No. 9,499,218 B1. The disclosures of these prior applications are considered part of the disclosure of this application and are hereby incorporated by reference in their entireties.

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND OF THE INVENTION

As technology advances, various types of robotic devices are being created for performing a variety of functions that may assist users. Robotic devices may be used for applications involving material handling, transportation, welding, assembly, and dispensing, among others. Over time, the manner in which these robotic systems operate is becoming more intelligent, efficient, and intuitive. As robotic systems become increasingly prevalent in numerous aspects of modern life, the desire for efficient robotic systems becomes apparent. Therefore, a demand for efficient robotic systems has helped open up a field of innovation in actuators, movement, sensing techniques, as well as component design and assembly.

SUMMARY OF THE INVENTION

The present disclosure generally relates to controlling a legged robot. Specifically, implementations described herein may allow for efficient operation of a legged robot by determining mechanically-timed footsteps for the robot. These as well as other aspects, advantages, and alternatives will become apparent to those of ordinary skill in the art by reading the following detailed description, with reference where appropriate to the accompanying drawings.

A first example implementation may include (i) determining, by a robot, a position of a center of mass of the robot, wherein the robot includes a first foot in contact with a ground surface and a second foot not in contact with the ground surface; (ii) determining a velocity of the center of mass of the robot; (iii) based on the determined position of the center of mass and the determined velocity of the center of mass, determining a capture point for the robot, where the capture point indicates a position on the ground surface; (iv) determining a threshold position for the capture point, where the threshold position is based on a target trajectory for the capture point after the second foot contacts the ground surface; (v) determining that the capture point has reached the threshold position; and (vi) based on the determination that the capture point has reached the threshold position, causing, by the robot, the second foot to contact the ground surface.

A second example implementation may include (i) determining, by a robot, a footstep pattern for the robot, where the robot comprises a first foot in contact with a ground surface and a second foot not in contact with the ground surface, and where the footstep pattern includes a target footstep location for the second foot; (ii) determining a position of a center of mass of the robot; (iii) determining a velocity of the center of mass of the robot; (iv) based on the determined position of the center of mass and the determined velocity of the center of mass, determining a capture point for the robot, where the capture point indicates a position on the ground surface; (v) determining a current trajectory for the capture point; (vi) based on the current trajectory of the capture point, updating the target footstep location for the second foot; (vii) determining a threshold position for the capture point, where the threshold position is based on a target trajectory for the capture point after the second foot contacts the ground surface; (viii) determining that the capture point has reached the threshold position; and (ix) based on the determination that the capture point has reached the threshold position, causing, by the robot, the second foot to contact the ground surface at the updated target footstep location for the second foot.

A third example implementation may include a system having means for performing operations in accordance with the first example implementation.

A fourth example implementation may include a system having means for performing operations in accordance with the second example implementation.

A fifth example implementation may include a biped robot having (i) a first foot; (ii) a second foot; (iii) a processor; (iv) a non-transitory computer readable medium, and (v) program instructions stored on the non-transitory computer readable medium that, when executed by the processor, cause the biped robot to perform operations in accordance with the first example implementation.

A sixth example implementation may include a biped robot having (i) a first foot; (ii) a second foot; (iii) a processor; (iv) a non-transitory computer readable medium, and (v) program instructions stored on the non-transitory computer readable medium that, when executed by the processor, cause the biped robot to perform operations in accordance with the second example implementation.

DETAILED DESCRIPTION OF THE PREFERRED EMBODIMENT

Figure 1:
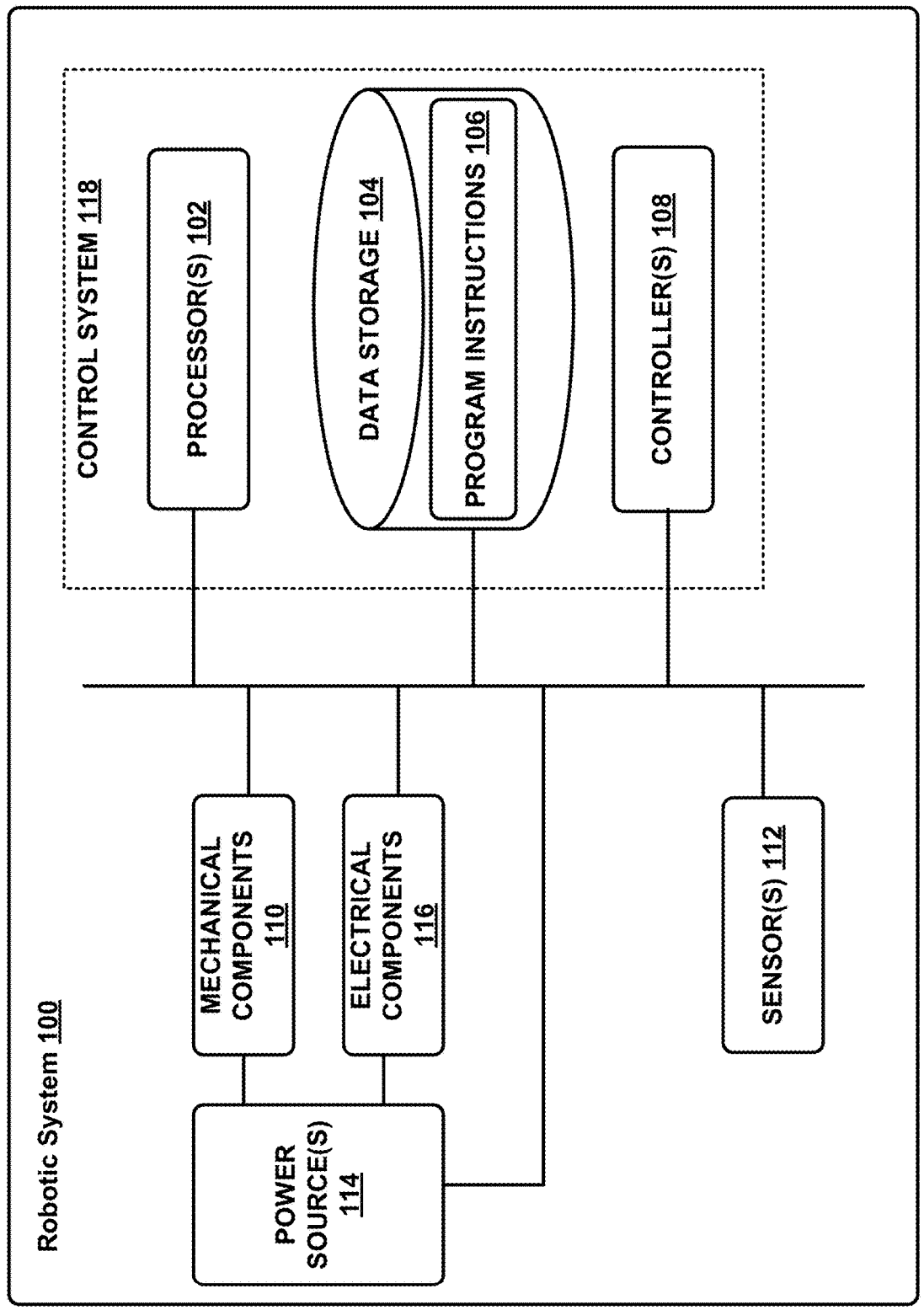
FIG. 1 illustrates a configuration of a robotic system, according to an example implementation.

Example implementations are described herein. The words "example," "exemplary," and "illustrative" are used herein to mean "serving as an example, instance, or illustration." Any implementation or feature described herein as being an "example," being "exemplary," or being "illustrative" is not necessarily to be construed as preferred or advantageous over other implementations or features. The example implementations described herein are not meant to be limiting. Thus, the aspects of the present disclosure, as generally described herein and illustrated in the figures, can be arranged, substituted, combined, separated, and designed in a wide variety of different configurations, all of which are contemplated herein. Further, unless otherwise noted, figures are not drawn to scale and are used for illustrative purposes only. Moreover, the figures are representational only and not all components are shown. For example, additional structural or restraining components might not be shown.

I. OVERVIEW

Example implementations relate to the determination of mechanically-timed footsteps for a robotic device. In some implementations, a robot may determine a footstep pattern. The footstep pattern may define a target path for the robot to follow and the locations of the footsteps the robot will take along the path. The footstep pattern may be based on a given destination, obstacles that that it may be desirable for the robot to avoid, among other examples.

During a given step, the robot may have a stance foot that is in contact with the ground surface and a swing foot that is not in contact with the ground surface. In some prior implementations, a robot might utilize a predetermined, clock-based timing for determining when to cause its swing foot to contact the ground surface, and then cause its stance foot to lift off of the ground surface. For instance, a robot might take footsteps at one second intervals, half-second intervals, among other examples.

Conversely, in the implementations described below, although the position of the robot's footsteps may be predetermined, the timing of when the robot will put down its swing foot and pick up its stance foot (i.e., when to take the next step) might not be predetermined. Rather, the robot may maintain its balance and react to disturbances in its gait by mechanically determining the timing for when to switch to the next step.

For example, the robot may determine a capture point on the ground surface during a given step. The capture point is based on the position and velocity of the robot's center of mass, and approximates the dynamic motion of the robot as if the robot's center of mass were falling as a linear inverted pendulum. Based on this model, the capture point represents the position on the ground surface where the robot may place its swing foot in order to completely arrest the falling, capturing the robot's momentum and bringing the robot to a stop. For instance, as the robot takes a step forward, with its right foot as the stance foot and with its left foot as the swing foot, the robot "falls" forward and to the left, and thus the capture point may generally follow the movement of the robot's center of mass, forward and to the left. If the robot were to cause its left foot to contact the ground surface at the position of the capture point, the robot may come to a stop.

However, if the robot is to continue moving at a particular gait, the robot might not step directly to the capture point. Instead, the robot may determine a threshold position for the capture point during a given step, and then base the timing of when to place its swing foot (e.g., its left foot) down and lift up its stance foot (e.g. its right foot) on a determination that the capture point has reached the threshold position. For instance, the threshold position for the capture point may be medial to the predetermined footstep location where the left foot will touch down. Thus, as the capture point approaches the threshold position, the left foot will touch down laterally outside of the capture point and the robot's center of mass. The shift in weight to the robot's left foot, formerly the swing foot, will cause the capture point to move back to the right, as the robot's center of mass "falls" toward the next footstep location for the right foot.

The threshold position for the capture point may be determined based on a number of variables. For a given footstep, the robot may determine its center of pressure, which represents the point at which the robot's mass acts upon the ground surface. According to the model of the robot falling as a linear inverted pendulum, the center of pressure represents the point about which the pendulum (i.e., the robot's center of mass) moves. Thus, as the robot "falls", the center of mass and the capture point move on a trajectory away from the center of pressure.

For example, when the left foot is swinging, the threshold position for the capture point may be determined based on a target trajectory for the capture point after the left foot touches down. This target trajectory approximates the line along which the robot will "fall" during the next step, toward its next footstep location. The target trajectory may be established by two points. The first is the center of pressure during the next step, which may be determined based on the known position of the upcoming stance foot (the left foot). The second point is a target position for the capture point at the end of the upcoming step of the right foot. The target position may be determined based on the determined footstep pattern, for example the given stride length and stance width, as well as the duration of the target swing period. The threshold position for the capture point may lie on a line between these two points that define the target trajectory, and may consider other factors as well.

When the capture point reaches the threshold position, the robot places the left foot down and picks the right foot up. This may cause the robot to "fall", and thereby cause the capture point to move, along the target trajectory established by the robot's center of pressure and the target position for the capture point. Further, the target position for the capture point may also represent the next threshold position for the capture point. Therefore, once the capture point approaches this next threshold, the robot may place its right foot (now the swing foot) down and pick up its left foot, and so on.

In some cases, the robot may experience a disturbance to its gait that may alter the current trajectory of the capture point. The robot may react to the gait disturbance by updating the threshold position for the capture point, adjusting the location of the center of pressure, adjusting its center of gravity in order to affect the trajectory of the capture point, among other examples.

However, in some cases, a gait disturbance may be such that the robot might not be able to correct it while still maintaining the determined footstep pattern. In these situations, the robot may determine an updated target footstep location for the swing foot that may place the capture point on a trajectory back toward the target trajectory, and return the robot to the determined footstep pattern.

II. EXAMPLE ROBOTIC SYSTEMS

Referring now to the figures, FIG. 1 illustrates an example configuration of a robotic system. The robotic system 100 represents an example robotic system configured to perform the implementations described herein. Additionally, the robotic system 100 may be configured to operate autonomously, semi-autonomously, and/or using directions provided by user(s), and may exist in various forms, such as a biped robot or a quadruped robot, among other examples. Furthermore, the robotic system 100 may also be referred to as a robotic device, mobile robot, or robot, among others.

As shown in FIG. 1, the robotic system 100 may include processor(s) 102, data storage 104, program instructions 106, and controller(s) 108, which together may be part of a control system 118. The robotic system 100 may also include sensor(s) 112, power source(s) 114, mechanical components 110, and electrical components 116. Note that the robotic system 100 is shown for illustration purposes as robotic system 100 and may include more or less components within various examples. The components of robotic system 100 may be connected in any manner, including wired or wireless connections, etc. Further, in some examples, components of the robotic system 100 may be positioned on multiple entities rather than a single entity. Other example illustrations of robotic system 100 may exist.

Processor(s) 102 may operate as one or more general-purpose processors or special purpose processors (e.g., digital signal processors, application specific integrated circuits, etc.). The processor(s) 102 may be configured to execute computer-readable program instructions 106 that are stored in the data storage 104 and are executable to provide the operations of the robotic system 100 described herein. For instance, the program instructions 106 may be executable to provide functionality of controller(s) 108, where the controller(s) 108 may be configured to cause activation and deactivation of the mechanical components 110 and the electrical components 116.

The data storage 104 may exist as various types of storage configured to hold memory. For example, the data storage 104 may include or take the form of one or more computer-readable storage media that can be read or accessed by processor(s) 102. The one or more computer-readable storage media can include volatile and/or non-volatile storage components, such as optical, magnetic, organic or other memory or disc storage, which can be integrated in whole or in part with processor(s) 102. In some implementations, the data storage 104 can be implemented using a single physical device (e.g., one optical, magnetic, organic or other memory or disc storage unit), while in other implementations, the data storage 104 can be implemented using two or more physical devices, which may communicate via wired or wireless communication. Further, in addition to the computer-readable program instructions 106, the data storage 104 may include additional data such as diagnostic data, among other possibilities.

The robotic system 100 may include at least one controller 108, which may interface with the robotic system 100. The controller 108 may serve as a link between portions of the robotic system 100, such as a link between mechanical components 110 and/or electrical components 116. In some instances, the controller 108 may serve as an interface between the robotic system 100 and another computing device. Further, the controller 108 may serve as an interface between the robotic system 100 and a user(s). The controller 108 may include various components for communicating with the robotic system 100, including a joystick(s), buttons, among others. The example interfaces and communications noted above may be implemented via a wired or wireless connection, or both. The controller 108 may perform other functions for the robotic system 100 as well. Other examples of controllers may exist.

Mechanical components 110 represent possible hardware of the robotic system 100 that may enable the robotic system 100 to operate and perform physical operations. As a few examples, the robotic system 100 may include actuator(s), extendable leg(s) ("legs"), arm(s), wheel(s), one or more structured bodies for housing the computing system or other components, and other mechanical components. The mechanical components 110 may depend on the design of the robotic system 100 and may also be based on the functions and/or tasks the robotic system 100 may be configured to perform. As such, depending on the operation and functions of the robotic system 100, different mechanical components 110 may be available for the robotic system 100 to utilize. In some examples, the robotic system 100 may be configured to add and/or remove mechanical components 110, which may involve assistance from a user and/or other robot. For example, the robotic system 100 may be initially configured with four legs, but may be altered by a user or the robotic system 100 to remove two of the four legs to operate as a biped. Other examples of mechanical components 110 may be included within some implementations.

Additionally, the robotic system 100 may include one or more sensor(s) 112 arranged to sense aspects of the robotic system 100. The sensor(s) 112 may include one or more force sensors arranged to measure load on various components of the robotic system 100. In an example, the sensor(s) 112 may include one or more force sensors on each leg. Such force sensors on the legs may measure the load on the actuators that move one or more members of the legs.

The sensor(s) 112 may further include one or more position sensors. Position sensors may sense the position of the actuators of the robotic system. In one implementation, position sensors may sense the extension, retraction, or rotation of the actuators on the legs of the robot. The sensor(s) 112 may further include one or more velocity and/or acceleration sensors. For instance, the sensor(s) 112 may include an inertial measurement unit (IMU). The IMU may sense velocity and acceleration in the world frame, with respect to the gravity vector. The velocity and acceleration of the IMU may then be translated to the robotic system, based on the location of the IMU in the robotic system and the kinematics of the robotic system. Other sensor(s) 112 are also possible, including proximity sensors, motion sensors, load sensors, touch sensors, depth sensors, ultrasonic range sensors, and infrared sensors, among other possibilities.

The sensor(s) 112 may provide sensor data to the processor(s) 102 to allow for appropriate interaction of the robotic system 100 with the environment as well as monitoring of operation of the systems of the robotic system 100. The sensor data may be used in evaluation of various factors for activation and deactivation of mechanical components 110 and electrical components 116 by controller 108 and/or a computing system of the robotic system 100.

The sensor(s) 112 may provide information indicative of the environment of the robot for the controller 108 and/or computing system to use to determine operations for the robotic system 100. For example, the sensor(s) 112 may capture data corresponding to the terrain of the environment or location of nearby objects, which may assist with environment recognition and navigation, etc. In an example configuration, the robotic system 100 may include a sensor system that includes RADAR, LIDAR, SONAR, VICON®, one or more cameras, a global positioning system (GPS) transceiver, and/or other sensors for capturing information of the environment of the robotic system 100. The sensor(s) 112 may monitor the environment in real-time and detect obstacles, elements of the terrain, weather conditions, temperature, and/or other parameters of the environment for the robotic system 100.

Further, the robotic system 100 may include other sensor(s) 112 configured to receive information indicative of the state of the robotic system 100, including sensor(s) 112 that may monitor the state of the various components of the robotic system 100. The sensor(s) 112 may measure activity of systems of the robotic system 100 and receive information based on the operation of the various features of the robotic system 100, such the operation of extendable legs, arms, or other mechanical and/or electrical features of the robotic system 100. The sensor data provided by the sensors may enable the computing system of the robotic system 100 to determine errors in operation as well as monitor overall functioning of components of the robotic system 100. For example, the computing system may use sensor data to determine a stability of the robotic system 100 during operations as well as measurements related to power levels, communication activities, components that require repair, among other information. As an example configuration, the robotic system 100 may include gyroscope(s), accelerometer(s), and/or other possible sensors to provide sensor data relating to the state of operation of the robot. Further, sensor(s) 112 may also monitor the current state of a function, such as a gait, that the robotic system 100 may currently be operating. Other example uses for the sensor(s) 112 may exist as well.

Additionally, the robotic system 100 may also include one or more power source(s) 114 configured to supply power to various components of the robotic system 100. Among possible power systems, the robotic system 100 may include a hydraulic system, electrical system, batteries, and/or other types of power systems. As an example illustration, the robotic system 100 may include one or more batteries configured to provide charge to components that may receive charge via a wired and/or wireless connection. Within examples, components of the mechanical components 110 and electrical components 116 may each connect to a different power source or may be powered by the same power source. Components of the robotic system 100 may connect to multiple power sources 114 as well.

Within example configurations, any type of power source may be used to power the robotic system 100, such as a gasoline engine. Further, the power source(s) 114 may charge using various types of charging, such as wired connections to an outside power source, wireless charging, combustion, or other examples. Additionally, the robotic system 100 may include a hydraulic system configured to provide power to the mechanical components 110 using fluid power. Components of the robotic system 100 may operate based on hydraulic fluid being transmitted throughout the hydraulic system to various hydraulic motors and hydraulic cylinders, for example. The hydraulic system of the robotic system 100 may transfer a large amount of power through small tubes, flexible hoses, or other links between components of the robotic system 100. Other power sources may be included within the robotic system 100 within examples.

The electrical components 116 may include various components capable of processing, transferring, providing electrical charge or electric signals, for example. Among possible examples, the electrical components 116 may include electrical wires, circuitry, and/or wireless communication transmitters and receivers to enable operations of the robotic system 100. The electrical components 116 may interwork with the mechanical components 110 to enable the robotic system 100 to perform various functions. The electrical components 116 may be configured to provide power from the power source(s) 114 to the various mechanical components 110, for example. Further, the robotic system 100 may include electric motors. Other examples of electrical components 116 may exist as well.

Figure 2:
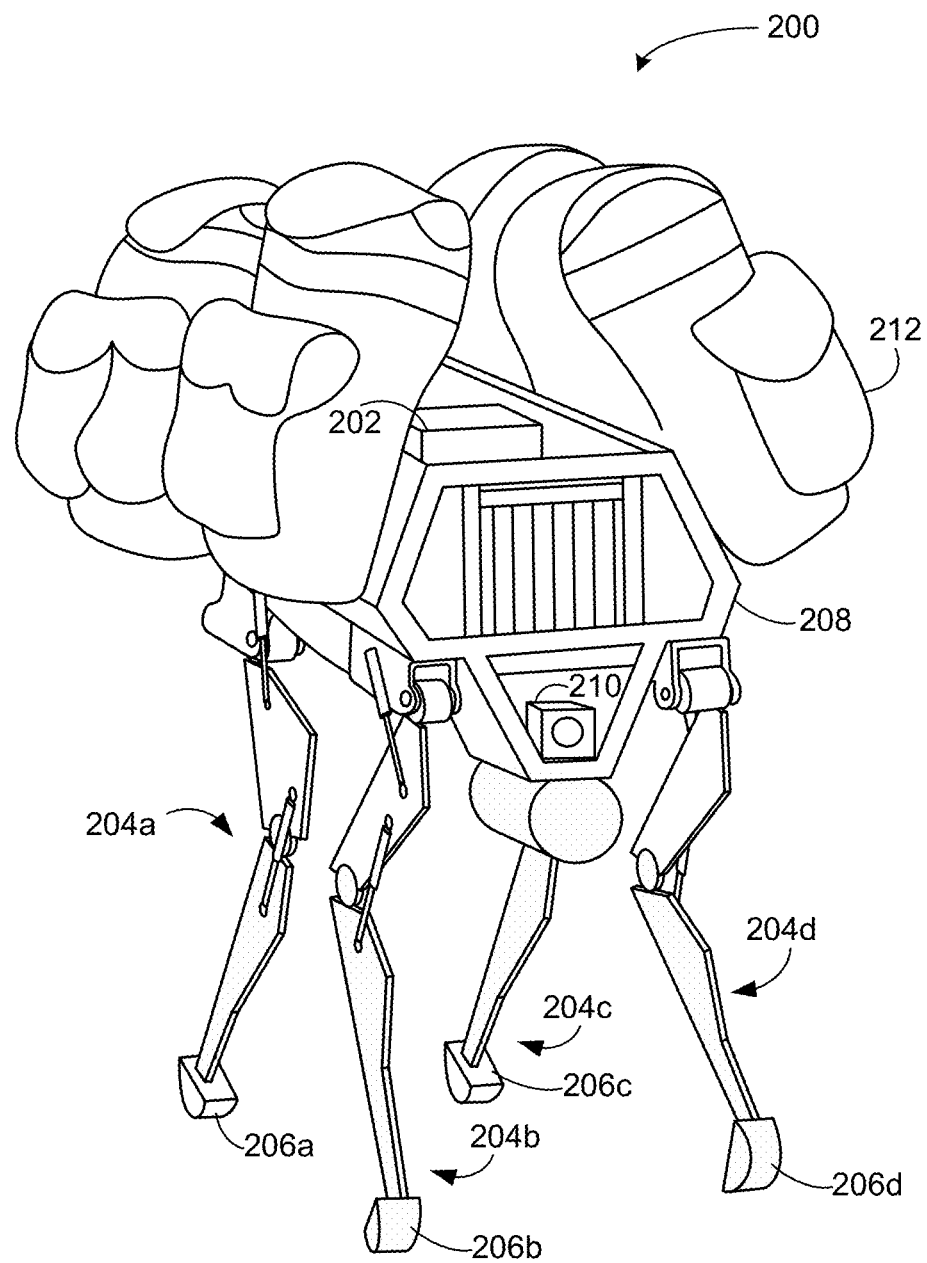
FIG. 2 illustrates a quadruped robot, according to an example implementation.

FIG. 2 illustrates an example quadruped robot 200, according to an example implementation. Among other possible functions, the robot 200 may be configured to perform some of the methods described herein during operation. The robot 200 includes a control system 202, and legs 204a, 204b, 204c, 204d connected to a body 208. Each leg may include a respective foot 206a, 206b, 206c, 206d that may contact the ground surface. The robot 200 may also include sensors (e.g., sensor 210) configured to provide sensor data to the control system 202 of the robot 200. Further, the robot 200 is illustrated carrying a load 212 on the body 208. Within other example implementations, the robot 200 may include more or less components and may additionally include components not shown in FIG. 2.

The robot 200 may be a physical representation of the robotic system 100 shown in FIG. 1 or may be based on other configurations. To operate, the robot 200 includes a computing system that may be made up of one or more computing devices configured to assist in various operations of the robot 200, which may include processing data and providing outputs based on the data. The computing system may process information provided by various systems of the robot 200 (e.g., a sensor system) or from other sources (e.g., a user, another robot, a server) and may provide instructions to the systems to operate in response.

Additionally, the computing system may monitor systems of the robot 200 during operation, to determine errors and/or monitor regular operation, for example. In some example configurations, the computing system may serve as a connection between the various systems of the robot 200 that coordinates the operations of the systems together to enable the robot 200 to perform functions. Further, although the operations described herein correspond to a computing system of a robot performing tasks, the computing system may be made of multiple devices, processors, controllers, and/or other entities configured to assist in the operation of the robot. Additionally, the computing system may operate using various types of memory and/or other components.

Although the robot 200 includes four legs 204a-204d in the illustration shown in FIG. 2, the robot 200 may include more or less legs within other examples. Further, the configuration, position, and/or structure of the legs 204a-204d may vary in example implementations. The legs 204a-204d enable the robot 200 to move and may be configured to operate in multiple degrees of freedom to enable different techniques of travel to be performed. In particular, the legs 204a-204d may enable the robot 200 to travel at various speeds through mechanically controlling the legs 204a-204d according to the mechanics set forth within different gaits. A gait is a pattern of movement of the limbs of an animal, robot, or other mechanical structure. As such, the robot 200 may navigate by operating the legs 204a-204d to perform various gaits. The robot 200 may use one or more gaits to travel within an environment, which may involve selecting a gait based on speed, terrain, the need to maneuver, and/or energy efficiency.

Further, different types of robots may use different gaits due to differences in design that may prevent use of certain gaits. Although some gaits may have specific names (e.g., walk, trot, run, bound, gallop, etc.), the distinctions between gaits may overlap. The gaits may be classified based on footfall patterns—the locations on the ground surface for the placement the feet 206a-206d. Similarly, gaits may also be classified based on mechanics.

One or more systems of the robot 200, such as the control system 118, may be configured to operate the legs 204a-204d to cause the robotic 200 to move. Additionally, the robot 200 may include other mechanical components, which may be attached to the robot 200 at various positions. The robot 200 may include mechanical arms, grippers, or other features. In some examples, the legs 204a-204d may have other types of mechanical features that enable control upon various types of surfaces that the robot may encounter, such as wheels, etc. Other possibilities also exist.

As part of the design of the example robot 200, the body 208 of the robot 200 connects to the legs 204a-204d and may house various components of the robot 200. As such, the structure of the body 208 may vary within examples and may further depend on particular operations that a given robot may have been designed to perform. For example, a robot developed to carry heavy loads may have a wide body that enables placement of the load. Similarly, a robot designed to reach high speeds may have a narrow, small body that does not have substantial weight. Further, the body 208 as well as the legs 204 may be developed using various types of materials, such as various metals or plastics. Within other examples, a robot may have a body with a different structure or made of other types of materials.

The sensor(s) 210 of the robot 200 may include various types of sensors, such as the camera or sensing system shown in FIG. 2. The sensor(s) 210 is positioned on the front of the body 208, but may be placed at other positions of the robot as well. As described for the robotic system 100, the robot 200 may include a sensory system that includes force sensors, position sensors, IMUs, RADAR, LIDAR, SONAR, VICON®, GPS, accelerometer(s), gyroscope(s), and/or other types of sensors. The sensor(s) 210 may be configured to measure parameters of the environment of the robot 200 as well as monitor internal operations of systems of the robot 200. As an example illustration, the robot 200 may include sensors that monitor the accuracy of its systems to enable the computing system to detect a system within the robot 100 that may be operating incorrectly. Other uses of the sensor(s) 210 may be included within examples.

The load 212 carried by the robot 200 may represent various types of cargo that the robot 200 may transport. The load 212 may also represent external batteries or other types of power sources (e.g., solar panels) that the robot 200 may utilize. The load 212 represents one example use for which the robot 200 may be configured. The robot 200 may be configured to perform other operations as well.

Additionally, as shown with the robotic system 100, the robot 200 may also include various electrical components that may enable operation and communication between the mechanical features of the robot 200. Also, the robot 200 may include one or more computing systems that include one or more processors configured to perform various operations, including processing inputs to provide control over the operation of the robot 200. The computing system may include additional components, such as various types of storage and a power source, etc.

During operation, the computing system may communicate with other systems of the robot 200 via wired or wireless connections and may further be configured to communicate with one or more users of the robot. As one possible illustration, the computing system may receive an input from a user indicating that the user wants the robot to perform a particular gait in a given direction. The computing system may process the input and may perform an operation that may cause the systems of the robot to perform the requested gait. Additionally, the robot's electrical components may include interfaces, wires, busses, and/or other communication links configured to enable systems of the robot to communicate.

Furthermore, the robot 200 may communicate with one or more users and/or other robots via various types of interfaces. In an example implementation, the robot 200 may receive input from a user via a joystick or similar type of interface. The computing system may be configured to measure the amount of force and other possible information from inputs received from a joystick interface. Similarly, the robot 200 may receive inputs and communicate with a user via other types of interfaces, such as a mobile device or a microphone. The computing system of the robot 200 may be configured to process various types of inputs.

Figure 3:
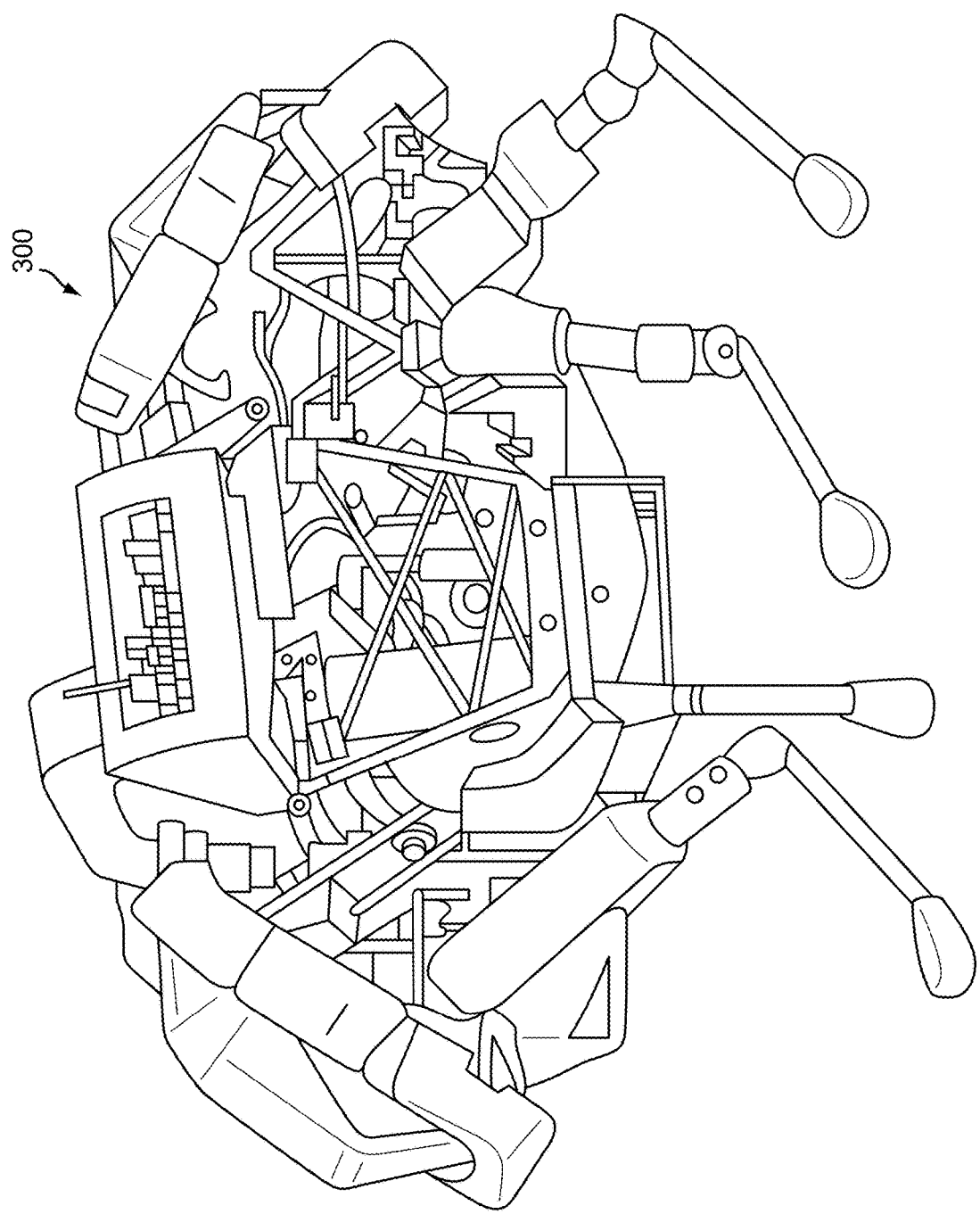
FIG. 3 illustrates another quadruped robot, according to an example implementation.

FIG. 3 illustrates another quadruped robot 300 according to an example implementation. Similar to robot 200 shown in FIG. 2, the robot 300 may correspond to the robotic system 100 shown in FIG. 1. The robot 300 serves as another possible example of a robot that may be configured to perform some of the implementations described herein.

Figure 4:
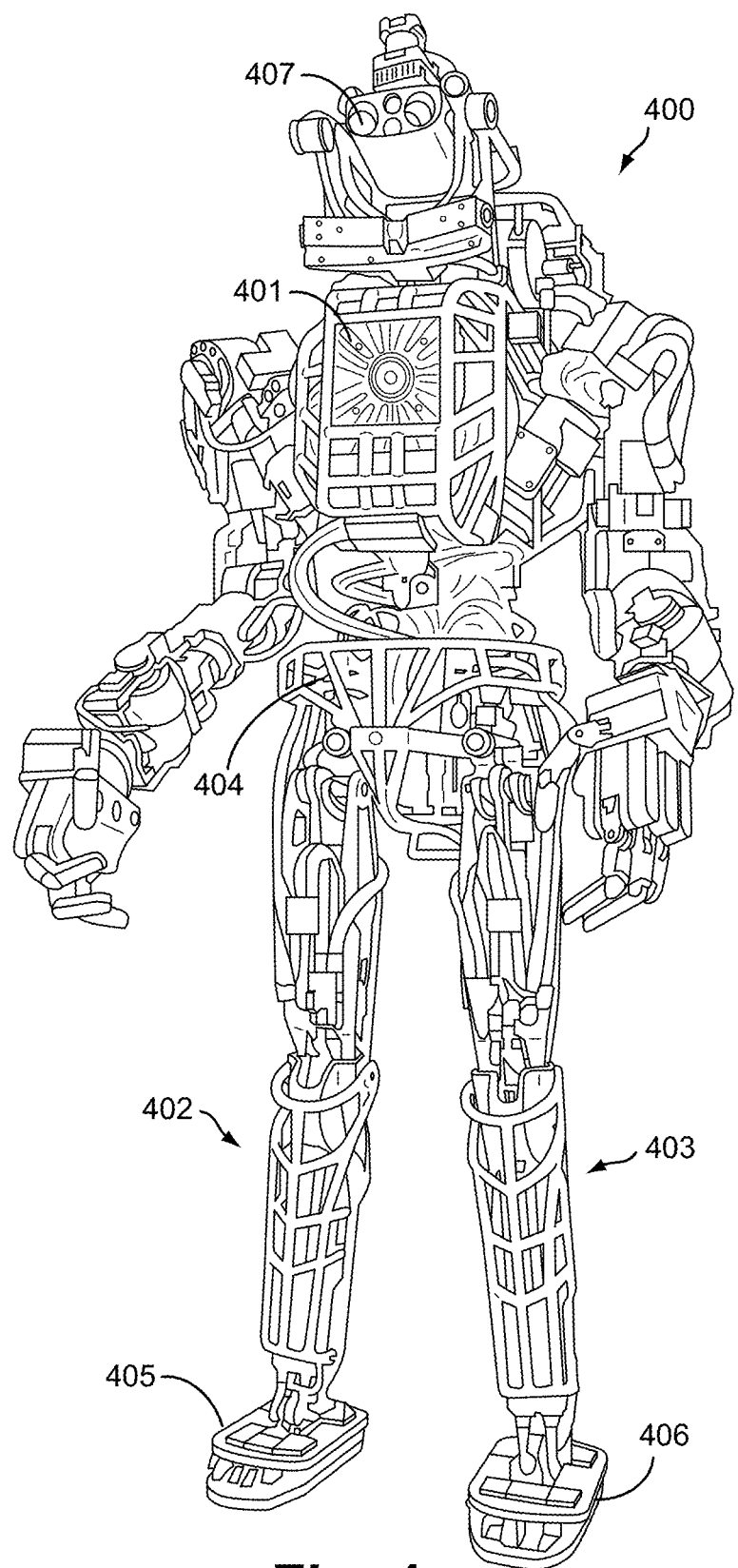
FIG. 4 illustrates a biped robot, according to an example implementation.

FIG. 4 illustrates a biped robot 400 according to another example implementation. Similar to robots 200 and 300 shown in FIGS. 2 and 3, the robot 400 may correspond to the robotic system 100 shown in FIG. 1, and may be configured to perform some of the implementations described herein. The robot 400 may include more or less components than those shown in FIG. 2 and discussed with respect to the robot 200. For example, the robot 400 may include a control system 401 and legs 402, 403 connected to a body 404. Each leg may include a respective foot 405, 406, that may contact the ground surface. The robot 400 may also include sensors (e.g., sensor 407) configured to provide sensor data to the control system 401 of the robot 400.

III. EXAMPLE IMPLEMENTATIONS FOR DETERMINING MECHANICALLY-TIMED FOOTSTEPS

Example implementations are discussed below for determining mechanically-timed footsteps for a legged robot. Flow charts 500 and 700, shown in FIGS. 5 and 7 respectively, present example operations that may be implemented by a biped robot, such as the example robot 400 shown in FIG. 4. Flow charts 500 and 700 may include one or more operations or actions as illustrated by one or more of the blocks shown in each figure. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, the flow charts 500 and 700 and other operations disclosed herein provide the operation of possible implementations. In this regard, each block may represent a module, a segment, or a portion of program code, which includes one or more instructions executable by a processor for implementing specific logical operations. The program code may be stored on any type of computer readable medium, for example, such as a storage device including a disk or hard drive. In addition, each block may represent circuitry that is wired to perform the specific logical operations.

Further, the term ground surface as used herein is meant to encompass any possible surface or terrain that the robot may encounter, and is not meant to be limiting. For instance, the ground surface may be indoors or outdoors, may be rigid or loose, such as sand or gravel, and may include discontinuities or irregularities such as stairs, rocks, fallen trees, debris, and the like. Numerous other examples exist.

First Example Implementation for Determining Mechanically-Timed Footsteps

Figure 5:
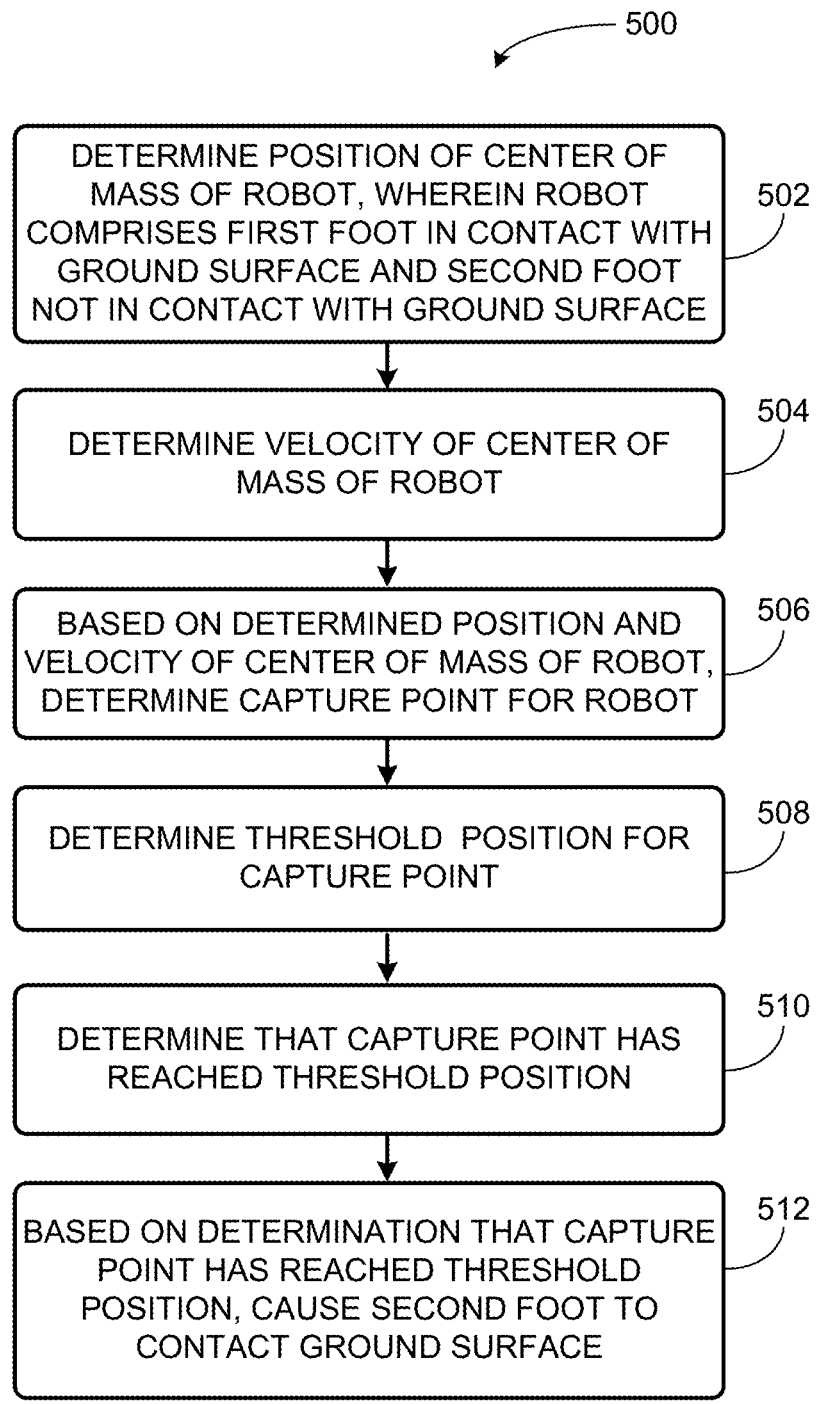
FIG. 5 is a flowchart according to an example implementation.

FIG. 5 is a flowchart 500 illustrating operations for determining mechanically-timed footsteps for an example robot based on the robot's capture point. The following paragraphs generally discuss examples involving a biped robot with two feet, however the operations may also be applicable to robots with a different number of feet, such as a quadruped robot with four feet, among other examples. Further, the operations discussed below may be performed by a robot that is walking, trotting, or running. Other gaits are also possible.

In some example implementations, a robot may determine a footstep pattern. The robot may be, for example, the robot 400 shown in FIG. 4. The footstep pattern may define a number of target footstep locations for the both the first foot 405 and the second foot 406. The robot 400 may then move at a given gait (e.g., walking, running, etc.) by placing its footstep at, or approximately at, the target footstep locations. The footstep pattern may be based on a given destination, the location of known obstacles for the robot to avoid, among other examples.

At block 502, the robot 400 may determine a position of a center of mass of the robot 400. In some cases, the robot 400 may determine its center of mass based on a point within the body 404 of the robot 400, which may approximate the robot's center of mass when the robot 400 is standing still.

Alternatively, the robot 400 may determine a center of mass that is specific to the current posture of the robot. For example, the robot 400 may have a first foot 405 (a right foot) in contact with the ground surface and a second foot 406 (a left foot) not in contact with the ground surface. These feet may also be referred to as the "stance" foot and the "swing" foot, respectively, although these designations will alternate as the robot 400 walks, runs, etc. Based on kinematic data from position and movement sensors in the robot's joints, the robot 400 may determine the relative position of one or more links in its arms, legs, etc., with respect to the body 404, and then calculate a center of mass based on this information in conjunction with the known mass of each link. Other examples are also possible.

At block 504, the robot 400 may determine a velocity of the center of mass. For example, the robot 400 may determine the velocity of the center of mass based on data received from one or more IMU sensors within the robot's body 404, kinematic data from joint sensors, an onboard LIDAR system, or a combination of these or other sensors.

At block 506, the robot 400 may determine a capture point based on the position of the center of mass and the velocity of the center of mass. The determination of the capture point approximates the dynamic motion of the robot 400 as if the robot's center of mass were falling according to a linear inverted pendulum. Further, the capture point itself represents a position on the ground surface where the robot 400 may place its swing foot 406 in order to completely arrest the falling, capturing the robot's momentum and bringing the robot 400 to a stop.

Figure 6:
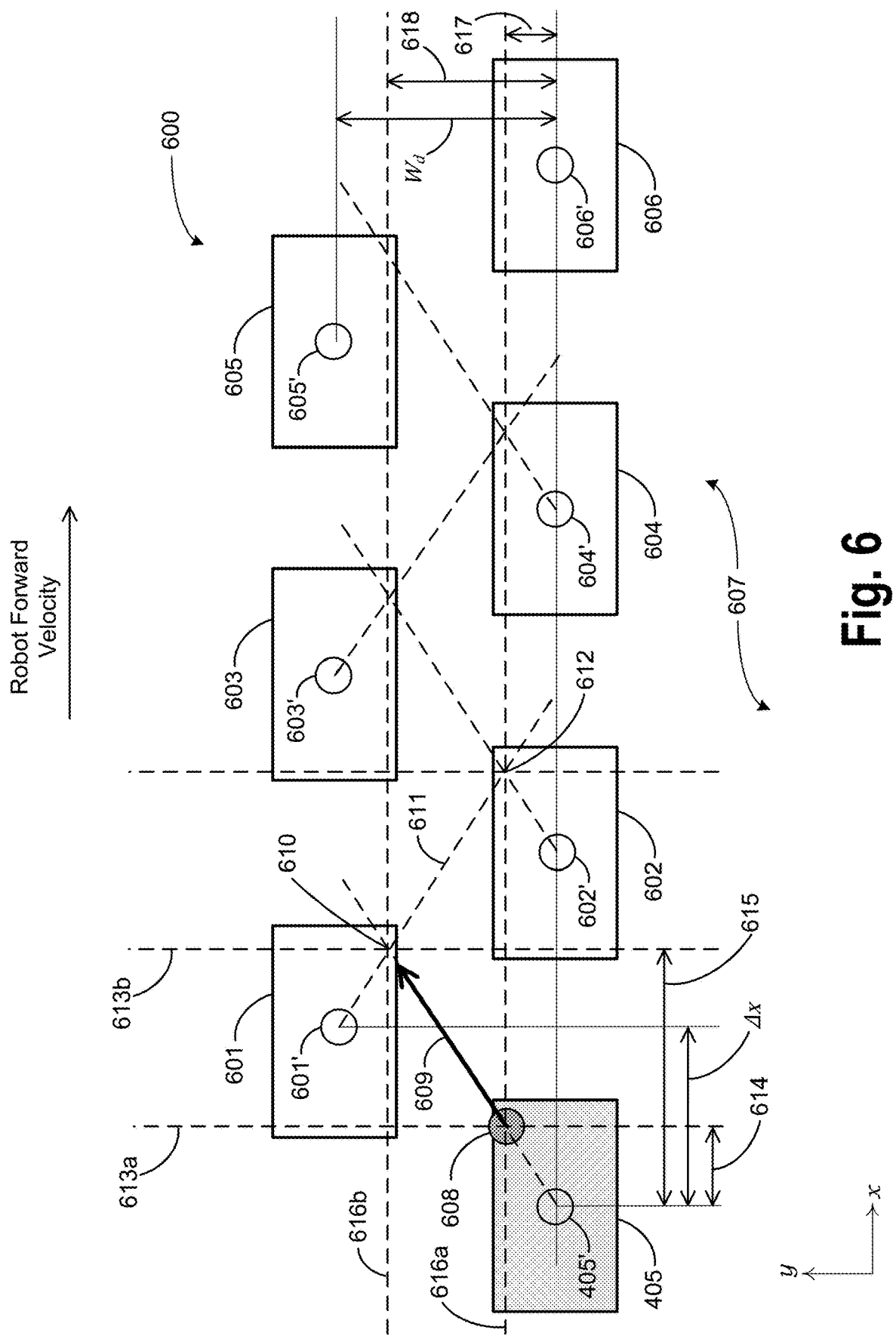
FIG. 6 illustrates a footstep pattern for a robot according to an example implementation.

The capture point may be illustrated by reference to FIG. 6, which shows an example footstep pattern 600 for the robot 400. Moving from left to right in FIG. 6, the footstep pattern 600 includes target footstep locations 601, 602, 603, 604, 605, and 606. In FIG. 6, the stance foot 405 (the right foot) is in contact with the ground surface 607 while the swing foot 406 (the left foot, not pictured) swings toward the target footstep location 601. During the step, according to the linear inverted pendulum model, the robot 400 "falls" forward and to its left, toward its next footstep location. Accordingly, the capture point 608 may move along a trajectory 609, forward and to the left, during the step.

In some cases, the robot 400 may determine a footstep pattern assuming point feet—that is, target footstep locations that are represented by a single point at which the forces exerted by the robot's foot act upon the ground surface. In other cases, such as the example shown in FIG. 6, the robot 400 may determine the footstep pattern based on target footstep locations that consider an approximate surface area of the robot's foot that will contact the ground surface. In this case, the robot 400 may also determine a target position for the center of pressure for each target footstep location, which represents the point at which the forces exerted by the robot's foot act upon the ground surface.

In FIG. 6, the center of pressure 405' for the current step of foot 405 is shown, as well as the target positions for the center of pressure 601', 602', 603', 604', 605', and 606' for each respective target footstep location. According to the linear inverted pendulum model, the robot's current center of pressure 405' represents the point about which the pendulum (i.e., the robot's center of mass) moves. Thus, as the robot 400 "falls" forward and to the left, the center of mass and, therefore, the capture point 608, move on a trajectory 609 away from the center of pressure 405'.

The timing for when the robot 400 will cause the swing foot 406 to contact the ground surface 607 may be determined mechanically by the robot 400. For instance, the robot 400 may repeat the operation of determining the capture point 608 at a frequency within the range of 100-1000 Hz, and thereby update the position of the capture point 608 at it moves along trajectory 609. For instance, the robot 400 may determine the position of the capture point 608 at a rate of 333 Hz.

Further, at block 508, the robot 400 may determine a threshold position 610 for the capture point 608. The robot 400 may also determine, at block 510, that the capture point 608 has reached the threshold position 610.

At block 512, based on the determination that the capture point 608 has reached the threshold position 610, the robot 400 may cause the swing foot 406 to contact the ground surface 607. For example, the threshold position 610 may be located such that the swing foot 406 will contact the ground surface laterally outside the capture point 608, just before it reaches the threshold position 610. As the robot 400 lifts the stance foot 405 off the ground surface 607, the stance foot becomes the swing foot and the center of pressure will move from 405' to 601'. This, in turn, will cause the robot 400 to "fall" (and the capture point 608 to move) along a new trajectory 611, away from the center of pressure 601', and toward the next target footstep location 602.

Accordingly, the threshold position 610 may be based on the target trajectory 611 for the capture point 608. As discussed, the target trajectory 611 corresponds to the movement of the capture point 608 after the swing foot 406 contacts the ground surface 607. In other words, the robot 400 may determine when to place its swing foot 406 on the ground surface 607 based on the target trajectory 611 for the capture point 608.

The target trajectory 611 for the capture point 608 may be determined based on several variables. For example, the target trajectory is defined by two points. The first point is the center of pressure 601' for the upcoming step, which is known based on the determined footstep pattern 600, and the known footstep location 601.

The second point is a target position 612 for the capture point 608 at the end of the next step, when the right foot 405 (now the swing foot) contacts the ground surface 607 at target footstep location 602. For example, the right foot 405 may have a nominal swing period with a beginning and an end. The target position 612 corresponds to the position of the capture point 608 at the end of the nominal swing period for the right foot 405. The threshold position 610 may lie on a line between these two points defining the target trajectory 611, and may consider other factors as well. For example, the threshold position 610 may be based on the size and configuration of the robot 400, the footstep pattern 600, the robot's forward velocity, the current posture of the robot 400, among other examples.

As can be seen in FIG. 6, the target position 612 may also correspond to the next threshold position for the capture point 608. Thus, the geometric pattern for the threshold position is repetitive for a constant footstep pattern 600. Each threshold position is determined such that the next footstep will "push" the capture point 608 along the next target trajectory, toward the next threshold position, and so on.

Each threshold position, including the threshold position 610, may be determined based on the intersection of a lateral threshold and a forward threshold, as shown in FIG. 6. The lateral and forward thresholds may be determined based on the geometry of the footstep pattern 600, including the stance width $w_d$ and the stride length $\Delta x$. Further, because the threshold position 610 is based on the target position 612 for the capture point 608 at the end of the upcoming step, the threshold position 610 is also based on the nominal swing period T for the upcoming step. The nominal swing period T may be related to the stride length $\Delta x$ by the following equation:

$$\Delta x = \dot{x}_d T$$

where $\dot{x}_d$ is the target forward velocity for the gait of the robot 400. For example, if the target velocity $\dot{x}_d$ for a given stride length increases, the nominal swing period T for the swing leg will decrease proportionally. The target gait velocity $\dot{x}_d$ may be input by a user, determined by the robot 400 based on its navigation and control systems, among other examples.

Further, the forward and lateral thresholds may be based on the dynamic motion of the robot 400 according to the linear inverted pendulum model. For example, the robot 400 may include a height, z, from the swing foot 406 to the robot's center of mass. Accordingly, the height z may correspond to the length of the pendulum, and may yield a time constant, $\lambda$, that represents the natural frequency of the robot 400 when modeled as a falling pendulum according to the following equation:

$$\lambda = \sqrt{\frac{z}{g}}$$

where g is the acceleration due to gravity. The time constant $\lambda$ is based on the configuration of the robot 400, specifically its height. For example, a robot 400 with relatively longer legs 402, 403 will "fall" according to the pendulum model at a different rate than a robot 400 that has relatively shorter legs 402, 403.

Based on the variables discussed above, the robot 400 may determine a first forward threshold 613a as a distance 614 from the center of pressure 405'. The first forward threshold 613a may correspond to the nominal forward position of the capture point 608 at the beginning of the swing period for the swing foot 406, i.e., at nominal swing time (0), when the stance foot 405 first contacts the ground surface 607. The robot 400 may calculate the first forward threshold 613a based on the following equation:

$$x_{cap,nom}(0) - x_{stnc}(0) = \frac{-\dot{x}_d T}{1 - \exp(\lambda T)}$$

where $x_{cap,nom}(0)$ represents the x-position of the capture point 608 at nominal time zero, and $x_{stnc}(0)$ represents the x-position of the stance foot 405 at nominal time zero. Thus, the difference between the two represents the distance 614, in the x-direction, between the stance foot 405 and the capture point 608 at the beginning of the step.

The robot 400 may also determine a second forward threshold 613b as a distance 615 from the center of pressure 405' of the stance foot 405. The second forward threshold 613b may correspond to the nominal forward position of the capture point 608 at the end of the swing period for the swing foot 406, i.e., at nominal swing time (T), when the swing foot 406 first contacts the ground surface 607 at target footstep location 601. The robot 400 may calculate the second forward threshold 613b based on the following equation:

$$x_{cap,nom}(T) - x_{stnc}(0) = \frac{-\dot{x}_d T \exp(\lambda T)}{1 - \exp(\lambda T)}$$

where $x_{cap,nom}(T)$ represents the x-position of the capture point 608 at nominal time T, at the end of the swing period, and $x_{stnc}(0)$ represents the x-position of the stance foot 405 at nominal time zero during the step. Thus, the difference between the two represents the distance 615, in the x-direction, between the stance foot 405 and the capture point 608 at the end of the step.

As noted above, these equations are applicable at each target location of the stance foot of the robot 400.

Similarly, the robot 400 may determine a first lateral threshold 616a as a distance 617 from the center of pressure 405' of the stance foot 405. The first lateral threshold 616a may correspond to the nominal lateral position of the capture point 608 at the beginning of the swing period for the swing foot 406, i.e., at nominal swing time (0), when the when the stance foot 405 first contacts the ground surface 607. The robot 400 may calculate the first lateral threshold 616a based on the following equation:

$$y_{cap,nom}(0) - y_{stnc}(0) = \frac{\pm w_d}{1 + \exp(\lambda T)}$$

where, similar to the equations above, $y_{cap,nom}(0)$ represents the y-position of the capture point 608 at nominal time 0, at the beginning of the swing period, and $y_{stnc}(0)$ represents the y-position of the stance foot 405 at nominal time zero during the step. Thus, the difference between the two represents the distance 617, in the y-direction, between the stance foot 405 and the capture point 608 at the beginning of the step.

The robot 400 may also determine a second lateral threshold 616*b* as a distance 618 from the center of pressure 405' of the stance foot 405. The second lateral threshold 616*b* may correspond to the nominal lateral position of the capture point 608 at the end of the swing period for the swing foot 406, i.e., at nominal swing time (T), when the swing foot 406 first contacts the ground surface 607 at target footstep location 601. The robot 400 may calculate the second lateral threshold 616*b* based on the following equation:

$$y_{cap,nom}(T) - y_{stnc}(0) = \frac{\pm w_d \exp(\lambda T)}{1 + \exp(\lambda T)}$$

where $y_{cap,nom}(T)$ represents the y-position of the capture point 608 at nominal time T, at the end of the swing period, and $y_{stnc}(0)$ represents the y-position of the stance foot 405 at nominal time zero during the step. Thus, the difference between the two represents the distance 618, in the y-direction, between the stance foot 405 and the capture point 608 at the end of the step.

Further, the y-direction equations above each have two solutions, one positive and one negative. The two solutions may be used for the alternating right and left stance feet, respectively. For instance, when the right foot 405 is the stance foot, the two lateral thresholds 616*a*, 616*b* are located in the positive y-direction from the right foot 405 (i.e., "up" in FIG. 6). Alternatively, when the left foot 406 is the stance foot, the two lateral thresholds 616*a*, 616*b* are located in the negative y-direction from the left foot 406 (i.e., "down" in FIG. 6).

As noted above, the robot 400 may cause the swing foot 406 to contact the ground surface 607 based on a determination that the capture point 608 has reached the threshold 610. For example, the robot 400 may update the position of the capture point 608 as it moves along trajectory 609. The robot 400 may determine the distance between the capture point 608 and the threshold position 610, and similarly update the determined distance between the two. As the capture point 608 approaches the threshold 610, the robot may begin to cause the swing foot 406 to contact the ground surface 607.

In some cases, the robot may cause the swing foot 406 to contact the ground surface 607 slightly before the capture point 608 reaches the threshold position 610. For example, based on the trajectory 609 of the capture point 608, the robot 400 may determine an approximate time until the capture point 608 reaches the threshold position 610. The approximate time may be expressed as a range, such as 0-100 milliseconds, a percentage of the nominal step duration, among other examples. The robot 400 may then cause the swing foot 406 to contact the ground surface 607 within the range of, for instance, 0-100 milliseconds before the capture point 608 reaches the threshold position 610. In some situations, this may allow the robot 400 to more readily shift its weight from the stance foot 405, and then pick up the stance foot 405.

In the examples discussed above, each step of the robot 400 is mechanically-timed. That is, the robot 400 determines when to put down its swing foot based on the current dynamics of its gait, namely the position and trajectory of the capture point 608. And although the threshold position 610 is based in part on a nominal swing period for the foot 405, the actual footstep timing might not correspond to the nominal swing period.

For instance, the robot 400 may encounter an obstacle or experience a disturbance that alters the forward velocity of the robot 400. For example, the robot 400 may be pushed forward. For a robot with a gait that is strictly timer-based, this may be problematic because the timed footstep may occur too late to capture robot's "falling", which has been accelerated forward. In other words, the robot's capture point may be too far ahead of the robot when the swing foot touches the ground. As a result, the robot might not be able to maintain its balance.

However, based on the examples of a mechanically-timed gait discussed above, the robot 400 in the same situation may determine that the position of the capture point 608 will approach the threshold 610 sooner than it would under nominal conditions. Accordingly, the robot 400 will cause the swing foot 406 to touch down at the target footstep location 601 more quickly than a nominal step, in order the "push" the capture point 608 toward the next footstep location.

Other examples are also possible, including examples where a disturbance may alter the trajectory 609 of the capture point 608. In this situation, the robot 400 may determine a number of responses. For instance, if the disturbance to trajectory 609 is not severe, the capture point 608 may still intersect with the target trajectory 611. Thus, the robot 400 may estimate an intersection between the current trajectory of the capture and the target trajectory 611, and then use this intersection as the threshold position to determine the touch down timing of the swing foot 406.

Additionally or alternatively, the robot 400 may manipulate the actuators in its stance leg 402 so as to adjust the contact between the stance foot 405 and the ground surface 607. In this way, the robot 400 may shift the location of the center of pressure point 405', which may adjust and possibly correct the trajectory of the capture point 608. For example, the robot 400 may rotate the stance foot 405 and in doing so, shift the center of pressure 405' more toward the outside edge of the foot 405. Other examples are also possible.

As another example, the robot 400 may determine a posture adjustment that may alter the relative position of the robot's center of mass. For instance, if the robot 400 experiences a disturbance that causes the trajectory of the capture point 608 to stray to the left, the robot 400 may respond by extending its right arm laterally, so as to shift the robot's overall center of mass to the right. This, in turn, may cause the trajectory of the capture point 608 to move back to the right. Numerous other disturbances and posture adjustments are also possible.

In some cases, a disturbance to the robot's gait may be such that the robot 400 cannot adequately control the trajectory of the capture point while still maintaining the determined footstep pattern 600. Such examples are discussed further below.

Further, although the footstep pattern shown in FIG. 600 represents a relatively straight line, the robot 400 may perform substantially the same operations as those described above for footstep patterns having different configurations. For example, the robot 400 may determine a capture point and thresholds for the capture point by applying the same principles to a footstep pattern that turns in multiple directions, changes its stride length, etc.

Second Example Implementation for Determining Mechanically-Timed Footstep

Figure 7:
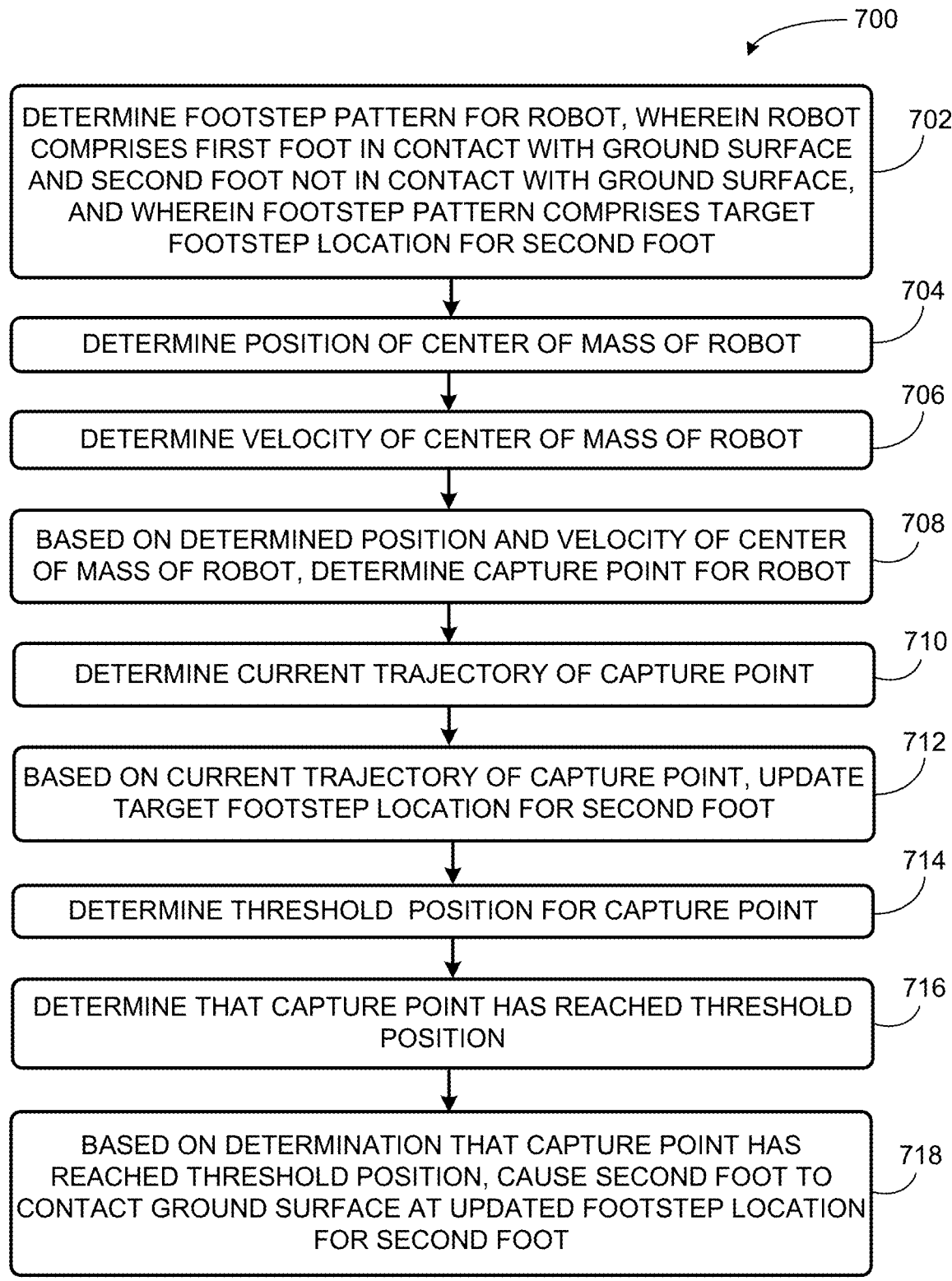
FIG. 7 is a flowchart according to an example implementation.

FIG. 7 is another flowchart 700 illustrating operations for determining mechanically-timed footsteps for an example robot based on the robot's capture point. The following paragraphs generally discuss examples involving a biped robot with two feet, however the operations may also be applicable to robots with a different number of feet, such as a quadruped robot with four feet, among other examples. Further, the operations discussed below may be performed by a robot that is walking, trotting, or running. Other gaits are also possible.

At block 702, a robot may determine a footstep pattern. The robot may be, for example, the robot 400 shown in FIG. 4. The robot 400 may include a first, stance foot 405 in contact with the ground surface and second, swing foot 406 not in contact with the ground surface. The footstep pattern may be determined as generally discussed above with respect to flowchart 500, and may include a target footstep location for the swing foot.

As also discussed above, the robot 400 may determine, at block 704, a position of a center of mass for the robot 400, and determine, at block 706, a velocity of the center of mass. Based on both of these determinations the robot 400 may, at block 708, determine a capture point for the robot 400, which corresponds to a point on the ground surface and approximates the dynamic motion of the robot 400 as a linear inverted pendulum, as discussed with respect to flowchart 500.

At block 710, the robot 400 may determine a current trajectory for the capture point. For example, the robot 400 may determine the capture point at a given frequency, as described above, and determine a current trajectory based on a series of recently determined capture points. Other examples are also possible.

Figure 8:
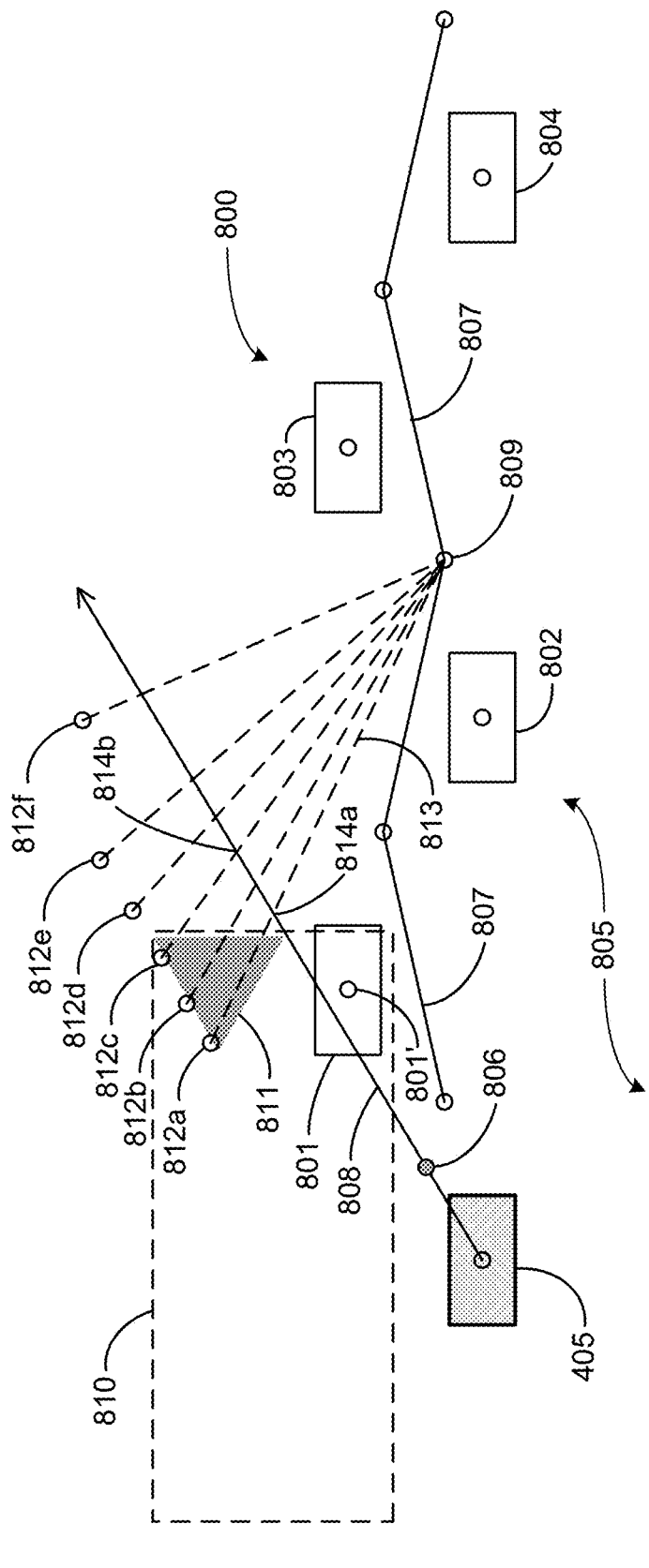
FIG. 8 illustrates a footstep pattern for a robot according to an example implementation.

FIG. 8 shows an example footstep pattern 800 for the robot 400, including target footstep locations 801, 802, 803, and 804. In FIG. 8, the stance foot 405 is in contact with the ground surface 805 while the swing foot 406 (not pictured) swings toward the target footstep location 801 for the swing foot 406. Based on the geometry of the footstep pattern 800, the capture point 806 may follow the target trajectory 807 throughout the footstep pattern 800, as discussed and calculated above with respect FIG. 6 and flowchart 500.

However, as shown in FIG. 8, the robot 400 may experience a disturbance to its gait that alters the trajectory of the capture point 806. Thus, the robot 400 may determine a current trajectory 808 for the capture point 806 that deviates substantially from the target trajectory 807. Based on the current trajectory, the robot 400 may determine that the target footstep location 801 for the swing foot 406 is not adequate to maintain control the robot's balance, posture, etc.

The determination that the target footstep location 801 is no longer adequate may be based on a number of factors. For instance, the robot 400 may determine that the current trajectory 808 for the capture point 806 is laterally outside the target center of pressure 801' for the upcoming step of the swing foot 406, as shown in FIG. 8. In this situation, causing the swing foot 406 to touch down at the target footstep location 801 may be counterproductive, as it may cause the capture point 806 to stray even further to the left.

Additionally or alternatively, the robot 400 may determine that other control priorities prevent it from correcting the current trajectory 808 in the ways discussed above. Further, the robot 400 may determine that an obstacle prevents it from placing the swing foot 406 at the target footstep location 801. Other examples are also possible.

Accordingly, at block 712, the robot 400 may update the target footstep location for the swing foot 406. For example, the robot 400 may determine an updated target footstep location that puts the capture point 806 on a trajectory back toward its target position 809 at the end of the following step of the right foot 405. As noted above, the target position 809 may represent the next threshold position for the following step of the robot 400, and may be determined as discussed above.

The potential positions for the updated target footstep location may be constrained. For instance, the robot 400 may determine a range of positions 810 for the target footstep location that is based on the mechanical limits of how far the robot 400 can reach with its swing leg 403. The range of positions 810 may be based on other factors as well, such as obstacles, other control priorities of the robot 400, among other examples.

However, not every location within the range of positions 810 is a feasible touchdown location for the swing foot 406, if the capture point 806 is to return to the target capture point position 809 in a single step. Thus, the robot 400 may further determine a step constraint region 811 that is based on the range of positions 810 as well as the current trajectory 808. As shown in FIG. 8, the step constraint region represents a region where the robot 400 may place the swing foot 406 that may result in a trajectory for the capture point 806 that returns to the target position 809.

For example, FIG. 8 shows a series of potential footstep locations which, for clarity, are only shown by way of their center of pressure 812a, 812b, 812c, 812d, 812e, and 812f. Each of these potential touchdown locations may result in a target trajectory, such as the target trajectory 813, for the capture point 806 that may direct the capture point 806 back to the target position 809. However, only the potential positions 812a, 812b, and 812c are feasible, as they are within the step constraint region 811. Thus, the target trajectory for the capture point may be based on the step constraint region 811.

At block 714, the robot 400 may determine a threshold position for the capture point 806. In some cases, where the step constraint region 811 represents a set of possible footstep locations, the robot 400 may determine a corresponding set of threshold positions. For instance, the robot 400 may determine set of threshold positions that comprises the line from 814a to 814b. The robot 400 may determine, based on its other control priorities or other factors, the updated target footstep location 812a from all of the potential locations within the step constraint region 811. Accordingly, the robot 400 may then determine the threshold position 814a for the capture point 806 that corresponds to the footstep location 812a. Other examples are also possible.

At block 716, the robot 400 may determine that the capture point 806 has reached the threshold position 814a, as discussed above. Based on this determination, the robot 400 may, at block 718, cause the swing foot 406 to contact the ground surface 805 at the updated target footstep location 812a for the swing foot 406. This may cause the capture point 806 to move on the trajectory 813 back toward the target position 809, which is the next threshold position according to the footstep pattern 800, as described above. The robot 400 may then cause the right foot 405 (now the swing foot) to contact the ground surface 805 as the capture point 806 approaches the next threshold position, and so on.

IV. CONCLUSION

While various implementations and aspects have been disclosed herein, other aspects and implementations will be apparent to those skilled in the art. The various implementations and aspects disclosed herein are for purposes of illustration and are not intended to be limiting, with the scope being indicated by the following claims.

What is claimed is:

1. A computer-implemented method that, when executing by data processing hardware of a legged robot, instructs the data processing hardware to perform operations comprising:
   determining a footstep pattern for at least a first leg and a second leg of the legged robot, wherein the footstep pattern is associated with a first robot trajectory, the first robot trajectory indicating a target robot path between two robot locations;
   instructing at least the first leg and the second leg to execute the footstep pattern with mechanically-timed execution;
   determining that a gait disturbance or obstacle causes an adjustment to the first robot trajectory and an adjustment to the footsetp pattern;
   based at least in part on the adjustment to the first robot trajectory and the adjustment to the footstep pattern, updating the footstep pattern to react to the gait disturbance or obstacle and produce an updated footstep pattern, wherein the updated footstep pattern is associated with a second robot trajectory that is different from the first robot trajectory and returns the legged robot toward the first robot trajectory; and
   instructing at least the first leg and the second leg to execute the updated footstep pattern.

2. The method of claim 1, wherein determining that the gait disturbance or obstacle causes the adjustment to the first robot trajectory comprises:
   determining a shift of a center of mass of the legged robot.

3. The method of claim 1, wherein determining that the gait disturbance or obstacle causes the adjustment to the first robot trajectory comprises:
   determining a velocity for the legged robot.

4. The method of claim 1, wherein updating the footstep pattern comprises updating a location for touchdown of a foot of the legged robot.

5. The method of claim 1, wherein updating the footstep pattern comprises:
   instructing manipulation of an actuator of the first leg.

6. The method of claim 1, wherein updating the footstep pattern comprises:
   instructing adjustment of a center of mass of the legged robot.

7. The method of claim 1, wherein the first robot trajectory is associated with a location on a ground surface to touch down a foot of the legged robot and arrest falling of a center of mass of the legged robot, and wherein instructing at least the first leg and the second leg to execute the footstep pattern with mechanically-timed execution comprises:
   tracking the first robot trajectory from a first position to a second position; and
   instructing the foot to touch down based on tracking the first robot trajectory.

8. The method of claim 7, wherein updating the footstep pattern comprises:
   updating the second position.

9. The method of claim 1, wherein the footstep pattern corresponds to at least one of a walking gait, a trotting gait, or a running gait.

10. The method of claim 1, wherein the legged robot comprises a body and four legs coupled to the body, and wherein a first two legs of the four legs are coupled to a first lateral side of the body and a second two legs of the four legs are coupled to a second lateral side of the body.

11. The method of claim 1, wherein instructing at least the first leg and the second leg to execute the footstep pattern with mechanically-timed execution comprises:
   receiving a user input indicating a velocity of the legged robot; and
   instructing the legged robot to execute a gait according to the velocity based on the user input.

12. A robot comprising:
   a body;
   at least two legs coupled to the body, the at least two legs comprising a first leg on a first lateral side of the body and a second leg on a second lateral side of the body; and
   a control system in communication with the at least two legs of the robot, the control system comprising at least one processor and configured to perform operations comprising:
      determining a footstep pattern for at least the first leg and the second leg, wherein the footstep pattern is associated with a first robot trajectory, the first robot trajectory indicating a target robot path between two robot locations;
      instructing at least the first leg and the second leg to execute the footstep pattern with mechanically-timed execution;
      determining that a gait disturbance or obstacle causes an adjustment to the first robot trajectory and an adjustment to the footstep pattern;
      based at least in part on the adjustment to the first robot trajectory and the adjustment to the footstep pattern, updating the footstep pattern to react to the gait disturbance or obstacle and produce an updated footstep pattern, wherein the updated footstep pattern is associated with a second robot trajectory that is different from the first robot trajectory and returns the robot toward the first robot trajectory; and
      instructing at least the first leg and the second leg to execute the updated footstep pattern.

13. The robot of claim 12, wherein determining that the gait disturbance or obstacle causes the adjustment to the first robot trajectory comprises:
   determining a shift of a center of mass of the robot.

14. The robot of claim 12, wherein determining that the gait disturbance or obstacle causes the adjustment to the first robot trajectory comprises:
   determining a velocity for the robot.

15. The robot of claim 12, wherein updating the footstep pattern comprises:
   updating a location for touchdown of a foot of the robot.

16. The robot of claim 12, wherein updating the footstep pattern comprises:
   instructing adjustment of a center of mass of the robot.

17. The robot of claim 12, wherein the first robot trajectory is associated with a location on a ground surface to touch down a foot of the robot and arrest falling of a center of mass of the robot, and wherein instructing at least the first leg and the second leg to execute the footstep pattern with mechanically-timed execution comprises:

tracking the first robot trajectory from a first position to a second position; and instructing the foot to touch down based on tracking the first robot trajectory.

18. The robot of claim 17, wherein updating the footstep pattern comprises:

updating the second position.

19. The robot of claim 12, wherein the at least two legs comprise four legs, and wherein a first two legs of the four legs are coupled to the first lateral side and a second two legs of the four legs are coupled to the second lateral side.

20. The robot of claim 12, wherein instructing at least the first leg and the second leg to execute the footstep pattern with mechanically-timed execution comprises:

receiving a user input indicating a velocity of the robot; and instructing the robot to execute a gait according to the velocity based on the user input.

* * * * *